United States Patent
Wada et al.

(10) Patent No.: US 8,493,728 B2
(45) Date of Patent: Jul. 23, 2013

(54) DISK UNIT AND DISK ARRAY APPARATUS

(75) Inventors: Naoki Wada, Odawara (JP); Toshihiro Arisaka, Odawara (JP); Daisuke Matsuka, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 137 days.

(21) Appl. No.: 13/256,827

(22) PCT Filed: Sep. 7, 2011

(86) PCT No.: PCT/JP2011/005011
§ 371 (c)(1),
(2), (4) Date: Sep. 15, 2011

(87) PCT Pub. No.: WO2013/035133
PCT Pub. Date: Mar. 14, 2013

(65) Prior Publication Data
US 2013/0058034 A1 Mar. 7, 2013

(51) Int. Cl.
*G06F 1/16* (2006.01)
(52) U.S. Cl.
USPC .... 361/679.34; 358/296; 248/921; 360/264.2
(58) Field of Classification Search
USPC ............... 358/1.2, 1.9, 402, 408, 1.15, 1.14, 358/296; 312/223.2, 219, 221, 348.4, 330.1, 312/348.1, 111, 319.4, 107.5, 247; 248/224.8, 248/274.1, 276.1, 305, 309.1, 278.1, 921, 248/636, 220.22, 228.11, 454; 345/158, 173, 345/177; 360/16, 265.5, 98.08, 234.5, 309.1, 360/244.2, 256.2, 234.3, 264.2, 290, 99.12; 361/679.01, 679.38, 679.37, 679.02, 679.33, 361/679.58, 679.21, 679.4, 679.27, 679.54, 361/679.43, 679.19, 679.35, 679.36, 679.03, 361/679.41, 679.06
See application file for complete search history.

(56) References Cited

U.S. PATENT DOCUMENTS

| | | | |
|---|---|---|---|
| 6,122,139 A | 9/2000 | Sri-Jayantha et al. | |
| 6,583,965 B1 | 6/2003 | Forbord et al. | |
| 7,558,058 B2 * | 7/2009 | Hidaka | 361/679.38 |
| 2002/0122294 A1 | 9/2002 | Mercer et al. | |

(Continued)

FOREIGN PATENT DOCUMENTS

| | | |
|---|---|---|
| JP | 2001-291363 | 10/2001 |
| JP | 2002-319280 | 10/2002 |

(Continued)

OTHER PUBLICATIONS

PCT International Search Report and Written Opinion on application PCT/JP2011/005011 mailed May 24, 2012; 10 pages.

*Primary Examiner* — Hung Duong
(74) *Attorney, Agent, or Firm* — Foley & Lardner LLP

(57) ABSTRACT

To reduce vibration in the rotation direction acting on the hard disk drive with a part of the hard disk drive as the rotation center. The disk unit comprises a hard disk drive comprising a drive mechanism which rotates and drives a plurality of disk media, an arm rotatably supported on a pivot and placed as movable in the rotation area of the disk media, and an actuator which performs positioning control of the magnetic head fixed to the arm to a target position on the disk media, a frame supporting the hard disk drive, and a dynamic absorber placed in the hard disk drive or in the frame, wherein the dynamic absorber absorbs vibration in the rotation direction acting on the hard disk drive with a part of the hard disk drive as the rotation center.

12 Claims, 24 Drawing Sheets

U.S. PATENT DOCUMENTS

| | | |
|---|---|---|
| 2004/0070865 A1 | 4/2004 | Sri-Jayantha et al. |
| 2010/0061007 A1 | 3/2010 | Matsushita et al. |
| 2010/0302724 A1* | 12/2010 | Nakayama ............... 361/679.36 |
| 2011/0182026 A1* | 7/2011 | Kang ....................... 361/679.37 |
| 2012/0056515 A1* | 3/2012 | Chen et al. ................. 312/223.2 |

FOREIGN PATENT DOCUMENTS

| | | |
|---|---|---|
| JP | 2004-134045 | 4/2004 |
| JP | 2006-185496 | 7/2006 |
| WO | WO 2008/139586 A1 | 11/2008 |

* cited by examiner

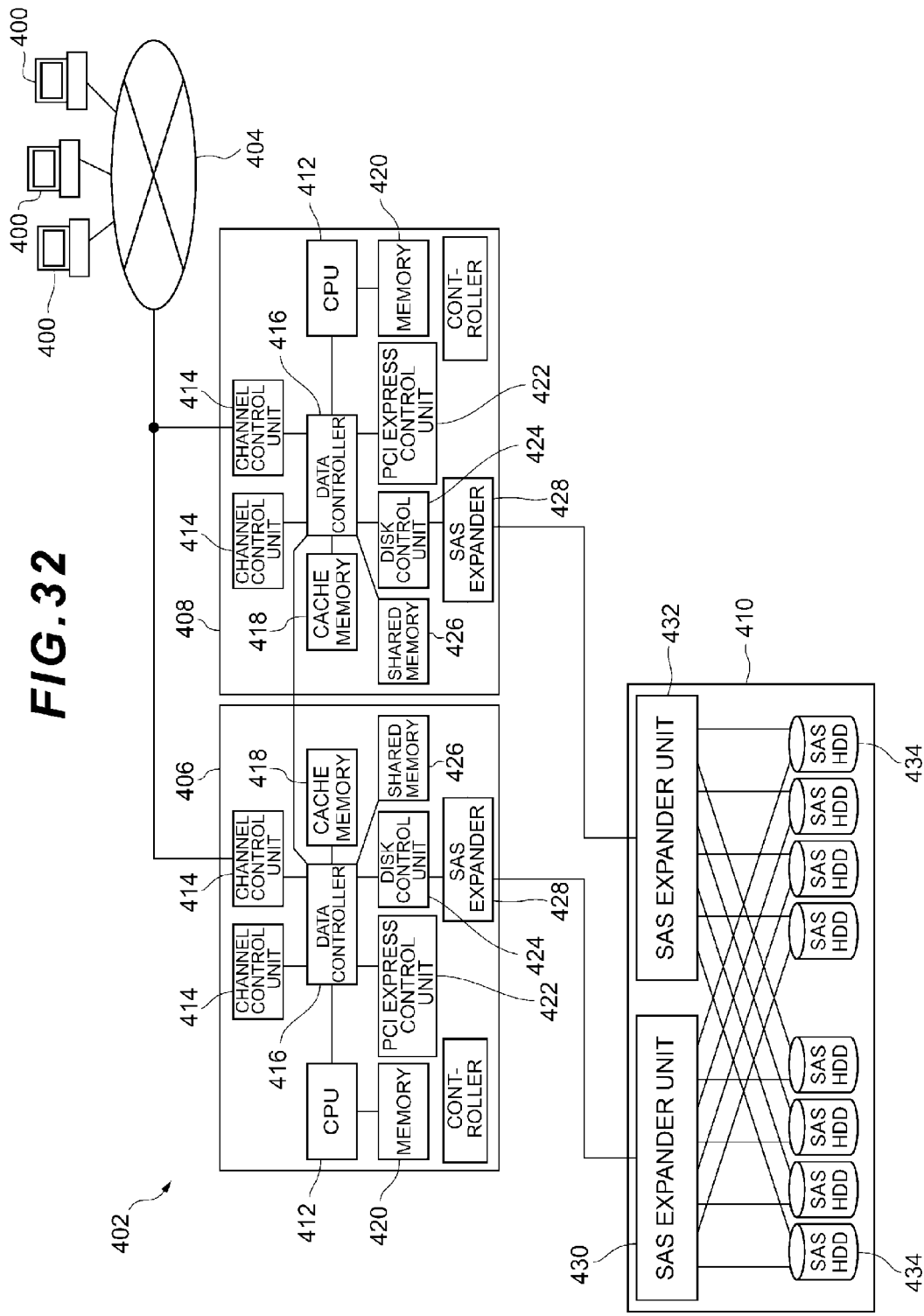

DISK UNIT AND DISK ARRAY APPARATUS

TECHNICAL FIELD

The present invention relates to a disk unit mounted with a magnetic disk and a disk array apparatus comprising the disk unit.

BACKGROUND ART

An HDD (Hard Disk Drive), for example, is installed as a storage device in the disk array apparatus. The HDD is configured of, for example, a drive mechanism which rotates and drives a plurality of magnetic disks, an arm rotatably supported on a pivot, a magnetic head fixed to the arm, an actuator which performs positioning control of the magnetic head to a target position on the magnetic disk, for example, a target track or a target cylinder, and others.

Recently, pursuant to the increase in the recording density of magnetic disks, the recording track width and the sector width on the magnetic disks are becoming narrower, and high accuracy is demanded for positioning magnetic heads. Consequently, an allowable range of gap in magnetic head positioning is becoming narrower.

As one of the causes interfering the improvement of the accuracy of magnetic head positioning, positioning errors which occur when the magnetic heads are vibrated can be named.

Since a magnetic head is fixed to the arm and the arm is rotatably supported on the pivot, if rotation vibration centering on a rotation axis normal to the magnetic disk surface occurs in the HDD, this rotation vibration will affect magnetic head positioning. Consequently, for maximizing the HDD performance, it becomes extremely important to reduce the rotation vibration whose rotation center is the rotation axis normal to the magnetic disk surface.

As a method for reducing the influence of the vibration, for example, a method in which a rapid change of acceleration due to the vibration is inhibited by incorporating a spring between the HDD unit and a substrate housing the HDD unit is proposed (refer to Patent Literature 1).

Furthermore, a method in which vibration energy is reduced by incorporating a dynamic absorber in a main chassis supporting a motor which drives optical disks is proposed (refer to Patent Literature 2 and Patent Literature 3). Furthermore, a magnetic disk apparatus in which head positioning errors are reduced even if rotation vibration in the planar direction parallel to the recording surface of the disk occurs is proposed (refer to Patent Literature 4).

Furthermore, a magnetic disk apparatus which sets a set of vibration detectors which detect rotation vibration contents in one axial direction as vibration detectors used for disturbance compensation of rotation vibration acting on the rotary actuator, before performing digital conversion for the detected data of rotation vibration, ascertains a difference of vibration detection signals by the set of vibration detectors in an analog computing circuit, inputs the difference in an AD converter, and processes the data in one AD converter is proposed (refer to Patent Literature 5).

Citation List
Patent Literature
PTL 1: Japanese Patent Application Laid-Open (Kokai) No. 2002-319280
PTL 2: Japanese Patent Application Laid-Open (Kokai) No. 2004-134045
PTL 3: Japanese Patent Application Laid-Open (Kokai) No. 2006-185496
PTL 4: Japanese Patent Application Laid-Open (Kokai) No. 2001-291363
PTL 5: International Publication No. 2008/139586

SUMMARY OF INVENTION

Technical Problem

By the method described in Patent Literature 1, the rapid change of acceleration can be inhibited, but vibration energy in the rotation direction acting on the HDD with a part of the HDD as the rotation center cannot be reduced, and the positioning errors of the magnetic head cannot be reduced.

Furthermore, the methods described in Patent Literature 2 and Patent Literature 3 are effective in the case of vibration in the translational direction (hereinafter also referred to as translational vibration) where the entire HDD moves in one direction, but vibration in the rotation direction acting on the HDD with a part of the HDD as the rotation center (hereinafter also referred to as rotation vibration) cannot be inhibited. Furthermore, in the disk array apparatus in the high-density packaging configuration, securing space for the dynamic absorber is difficult even if the dynamic absorber described in Patent Literature 2 and Patent Literature 3 is adopted.

Furthermore, the method described in Patent Literature 4, where the new component is installed inside the HDD, is difficult to apply to the existing HDDs. Furthermore, in the magnetic disk apparatus described in Patent Literature 5, as for the case where vibration in the rotation direction centering on the rotation axis normal to the magnetic disk surface occurs in the HDD, inhibiting this vibration is not considered.

Specifically, by the methods described in each of the Patent Literatures, if vibration in the rotation direction whose rotation center is the rotation axis normal to the magnetic disk surface occurs in the HDD, the performance of the entire magnetic disk device or disk array apparatus will be affected for the reason this rotation vibration causes positioning errors in the magnetic head.

The present invention was devised formed in view of the problems of the conventional technologies, and its object is to provide a disk unit and a disk array apparatus utilizing the disk unit capable of reducing vibration in the rotation direction acting on the hard disk drive with a part of the hard disk drive as the rotation center.

Solution to Problem

For achieving the purpose, the present invention is characterized by comprising a hard disk drive including a disk medium, a chassis supporting the hard disk drive, and a dynamic absorber placed in the hard disk drive or the chassis, wherein the dynamic absorber absorbs vibration in the rotation direction acting on the hard disk drive with a part of the hard disk drive as the rotation center. Here, an auxiliary dynamic absorber which absorbs vibration in the translational direction where the entire hard disk drive vibrates in a certain direction can also be placed in the chassis. Furthermore, the dynamic absorber, which is installed outside the hard disk drive, may easily be applied to any types of HDDs.

Advantageous Effects of Invention

According to the present invention, vibration in the rotation direction acting on the hard disk drive with a part of the hard disk drive as the rotation center can be reduced.

BRIEF DESCRIPTION OF DRAWINGS

FIG. 32 is a configuration diagram of the computer system.

DESCRIPTION OF EMBODIMENTS

Hereinafter, an embodiment of the present invention is explained with reference to the drawings.

(Embodiment 1)

The present embodiment is an application example of the case where the dynamic absorber for absorbing vibration in the rotation direction acting on the HDD unit is installed in the HDD unit.

Figure 1:
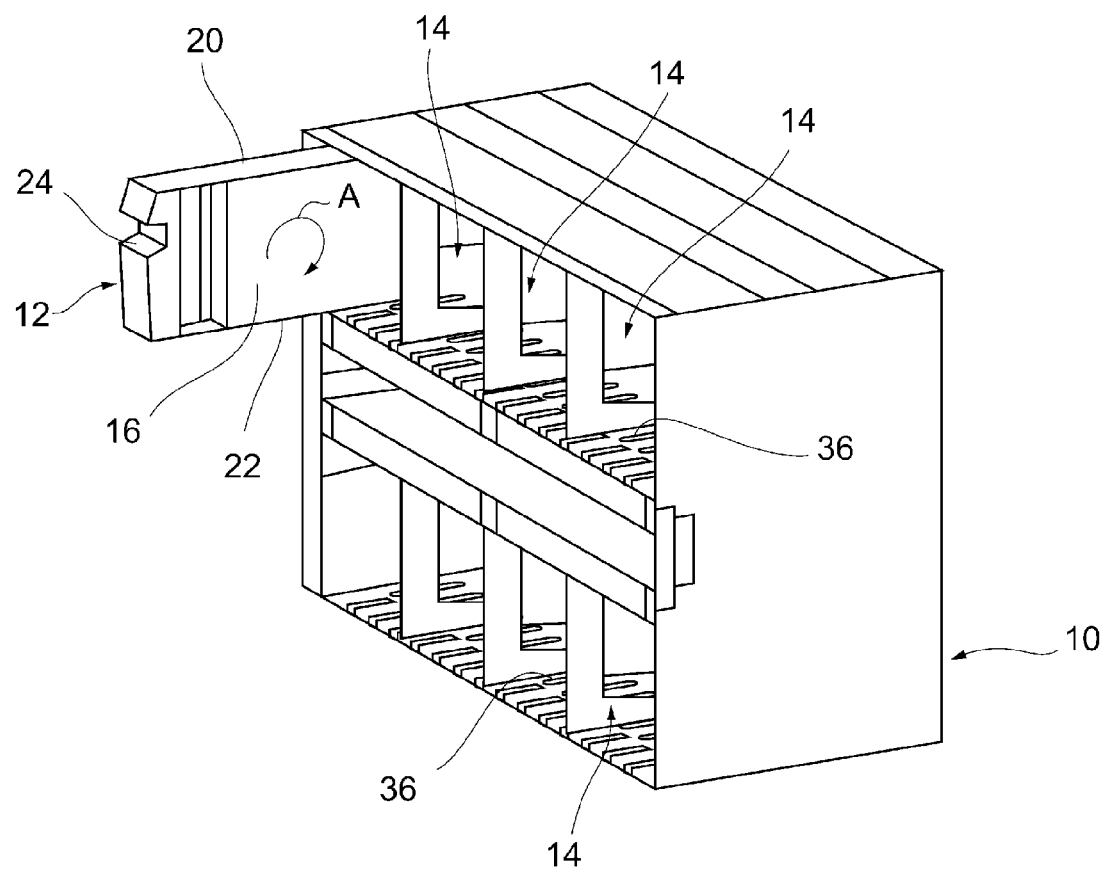
FIG. 1 is a perspective diagram of an HDD housing device in which an HDD unit is vertically installed.

The perspective diagram of an HDD housing device in which an HDD unit is vertically installed is shown in FIG. 1. In FIG. 1, the HDD housing device 10 comprises a plurality of housing units 14 for housing disk units, for example, HDD units 12. In each of the housing units 14, each of the HDD units 12 is vertically installed. Specifically, each of the HDD units 12 is installed in each of the housing units 14 in such direction as the magnetic disk surface (not shown in the figure) of the HDD 16 is parallel to the vertical axis (a virtual axis indicating the direction in which gravity acts).

Figure 2:
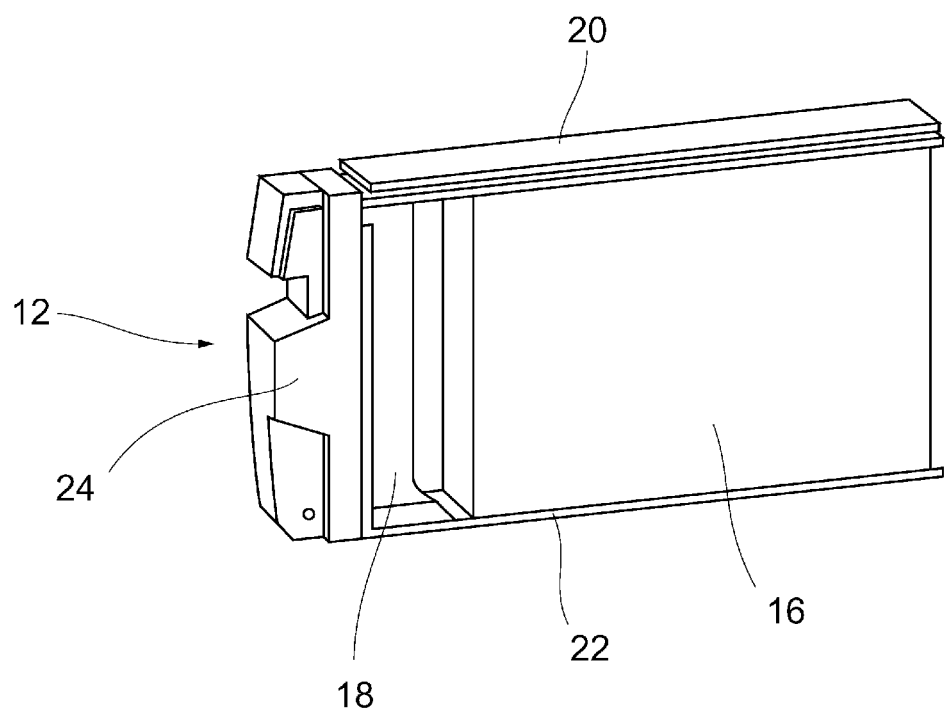
FIG. 2 is a perspective diagram of the HDD unit.
Figure 3:
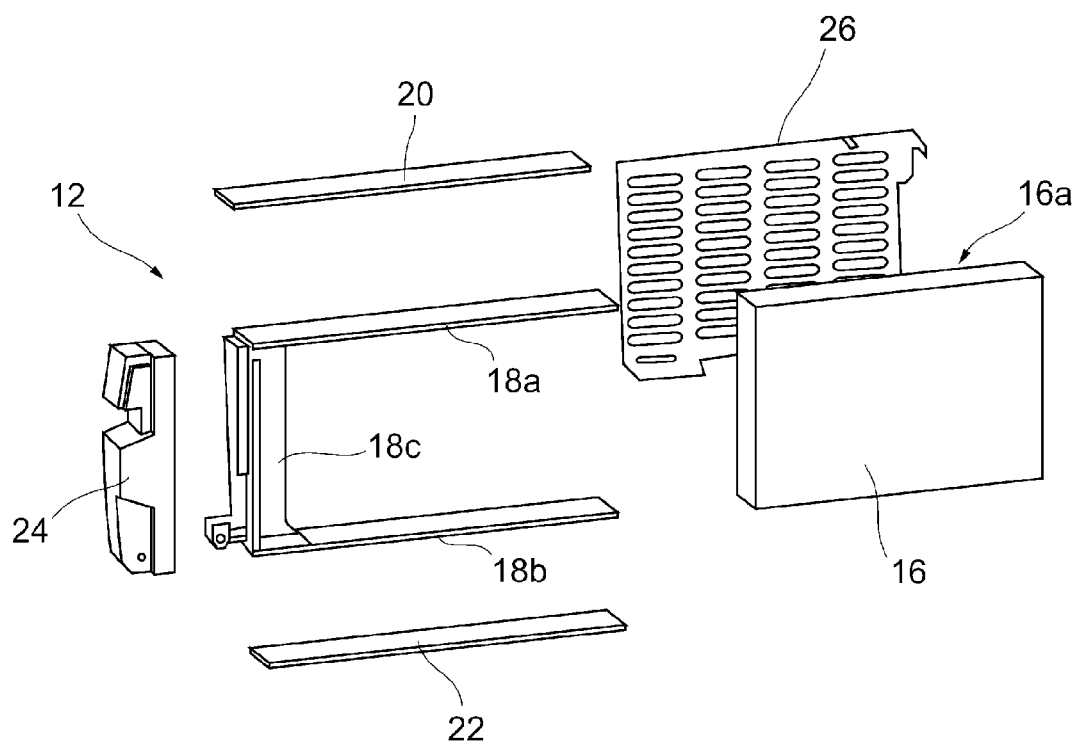
FIG. 3 is an exploded perspective diagram of the HDD unit.

Next, the perspective diagram of the HDD unit is shown in FIG. 2 and the exploded perspective diagram of the HDD unit is shown in FIG. 3.

In FIG. 2 and FIG. 3, the HDD unit 12 comprises an HDD 16 formed in the shape of a frame-like box, a canister 18 configuring a chassis for supporting the HDD 16, a rail 20 mounted on a side 18*a* of the canister 18, a rail 22 mounted on a side 18*b* of the canister 18, a handle 24 detachably mounted on a head 18*c* of the canister 18, and an HDD cover 26 covering the canister 18, the rail 20, and the rail 22 as well as covering a substrate surface 16*a* of the HDD 16.

Figure 4:
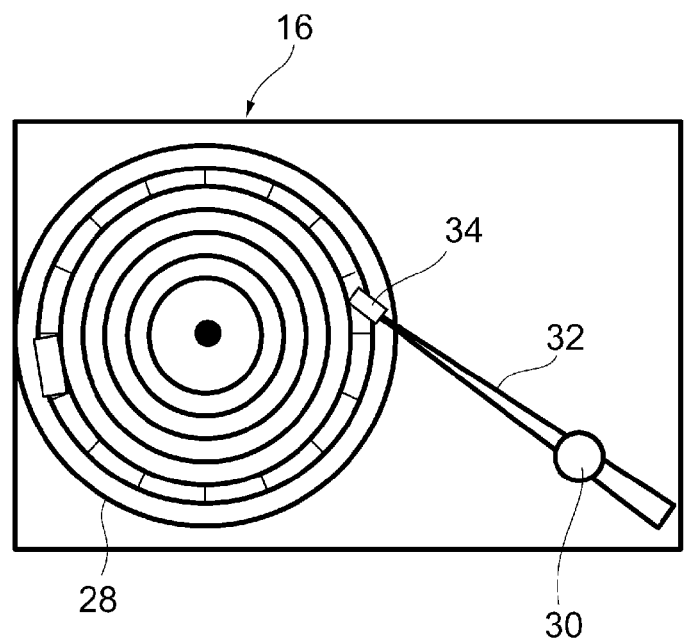
FIG. 4 is a plain view of the HDD.

As shown in FIG. 4, the HDD 16 is configured of a drive mechanism (not shown in the figure) which rotates and drives one or more magnetic disks (disk media) 28, an arm 32 which is rotatably supported on a pivot and placed as movable in the rotation area of the magnetic disk 28 with a pivot 30 as the rotation center, a magnetic head 34 fixed to the end of the arm 32, an actuator (not shown in the figure) which performs positioning control of the magnetic head 34 to a target position on the magnetic disk 28, and others.

A dynamic absorber for absorbing vibration in the rotation direction acting on the HDD 16 (hereinafter the vibration in the rotation direction acting on the HDD 16 may be also referred to as vibration in the rotation direction acting on the HDD unit 12) is installed in the HDD unit 12 shown in FIG. 2 and FIG. 3.

Figure 5:
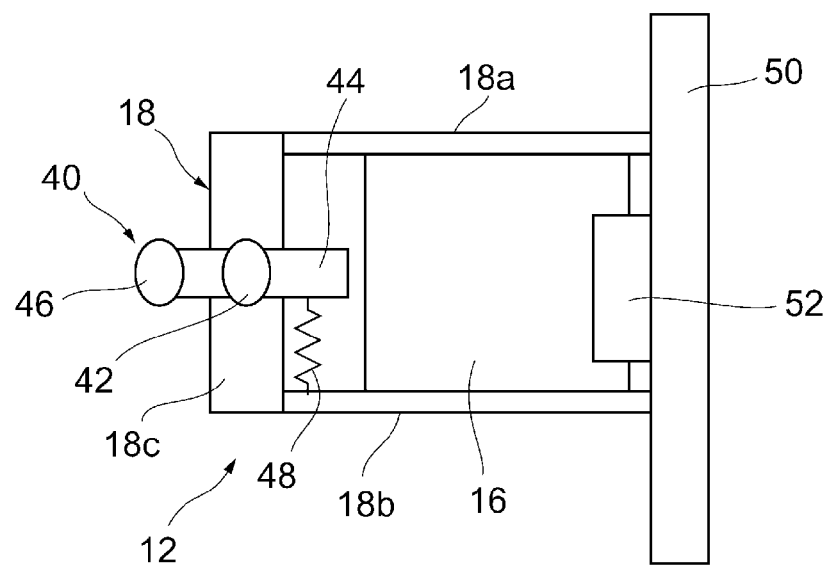
FIG. 5 is a plain view of the dynamic absorber fixed to a backboard.
Figure 6:
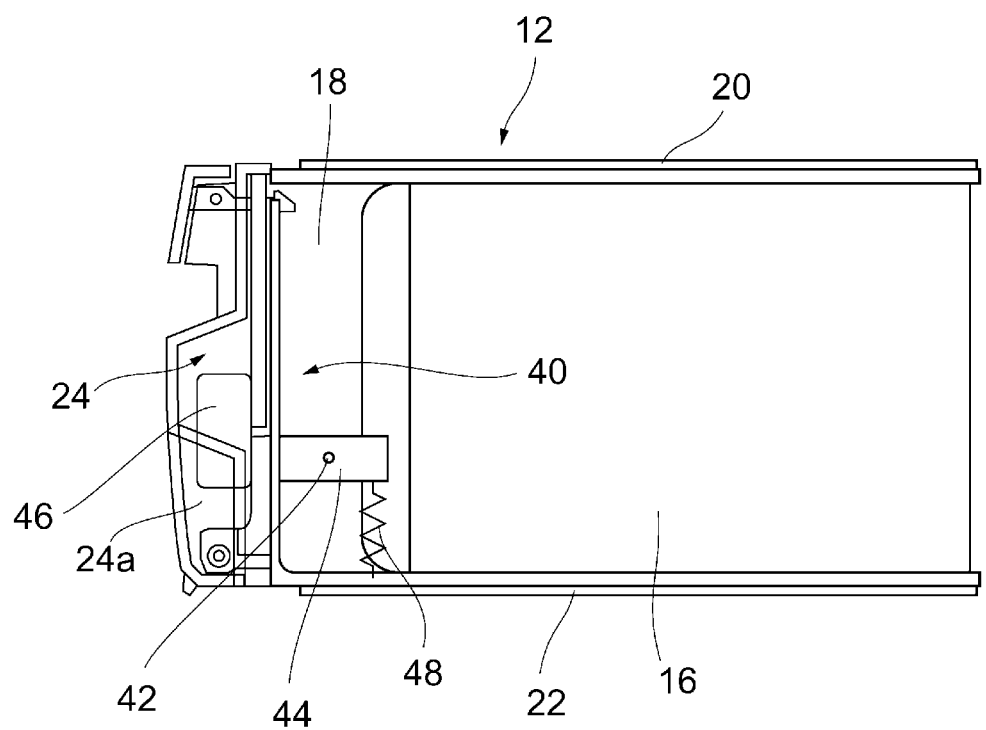
FIG. 6 is a plain view of the HDD unit in which the dynamic absorber is installed.

Next, the plain view of an HDD unit in which the dynamic absorber is installed in the canister and which is installed on the backboard is shown in FIG. 5, and the plain view of the HDD unit in which the dynamic absorber is installed in the canister is shown in FIG. 6.

In FIG. 5, the HDD unit 12 is configured as the dynamic absorber 40 for absorbing vibration in the rotation direction acting on the HDD 16 is installed in the canister 18 (hereinafter the HDD unit 12 in which the dynamic absorber 40 is installed in the canister 18 may be simply referred to as an HDD unit 12). This dynamic absorber 40 is installed in the canister 18 for preventing the occurrence of positioning errors on the magnetic head 34 due to this rotation vibration in case vibration in the rotation direction whose rotation center is the rotation axis normal to the magnetic disk surface occurs in the HDD 16, and is configured of a cylinder 42, a beam 44, a weight 46, and a spring 48.

The cylinder 42 is inserted in a throughhole (not shown in the figure) formed around the center of the beam 44, and one end thereof is fixed to the head 18*c* of the canister 18. The beam 44 is configured as a supporting board in the form of a flat board, and the part around the center is supported on the cylinder 42. The weight 46 is fixed to one end of the axial direction of the beam 44, and one end of the spring 48 is fixed to the other end of the axial direction of the beam 44. The spring 48 is, for example, formed in the form of a coil, and one end of the axial direction of the spring is fixed to the beam 44 while the other end of the axial direction is fixed to the side 18b of the canister 18.

Specifically, the beam 44 is rotatably disposed with the cylinder 42 as the rotation center, the load by the weight 46 is added to one end of the axial direction, and the elastic force by the spring 48 is added to the other end of the axial direction.

Here, if the weight 46 is placed at as far a position as possible from the cylinder 42 which is the rotation center, the kinetic energy at rotation increases and the efficiency of the vibration absorption can be improved, but the excessive extension of the distance from the cylinder 42 will cause the weight 46 to protrude from the handle 24.

Therefore, a configuration in which the distance between the weight 46 and the cylinder 42 is extended as long as possible while a cavity 24a is formed in the handle 24, and the weight 46 is stored in the cavity 24a of the handle 24 is adopted. Consequently, even if the dynamic absorber 40 is installed in the HDD unit 12, the cavity 24a in the handle 24 can be efficiently utilized as housing space without having to increase the size of the HDD unit 12.

Furthermore, in the HDD unit 12, the HDD 16 is detachably mounted on a connector 52 fixed to the backboard 50 which is one of the components of the housing unit 14 in the HDD housing device 10. Specifically, in the HDD 16 of the HDD unit 12, an HDD connector (not shown in the figure) which is connectable to the connector 52 is placed on an extended line of the axial direction of the beam 44, and this HDD connector is detachably mounted on the connector 52. On the HDD connector and the connector 52, pins for supplying power to the HDD 16, pins for transmitting data and information, and others are placed.

Furthermore, for installing the HDD unit 12 comprising the dynamic absorber 40 in the HDD housing device 10, the HDD unit 12 is vertically installed along guides 36 formed on the upper and lower internal surfaces of each of the housing units 14.

Specifically, on the upper and lower internal surfaces of each of the housing units 14, a pair of guides 64 facing each other for shifting the HDD 16 of the HDD unit 12 in the horizontal direction is placed in the horizontal direction from the open side toward the backboard side while a plurality of pairs of guides 36 are placed at equal intervals from the left lateral side to the right lateral side. Consequently, the HDD unit 12 is vertically installed in the housing unit 14 as the rails 20 and 22 shift in the horizontal direction from the open side toward the backboard side along the pair of guides 36 after the HDD connector side is inserted in the housing unit 14.

Figure 7:
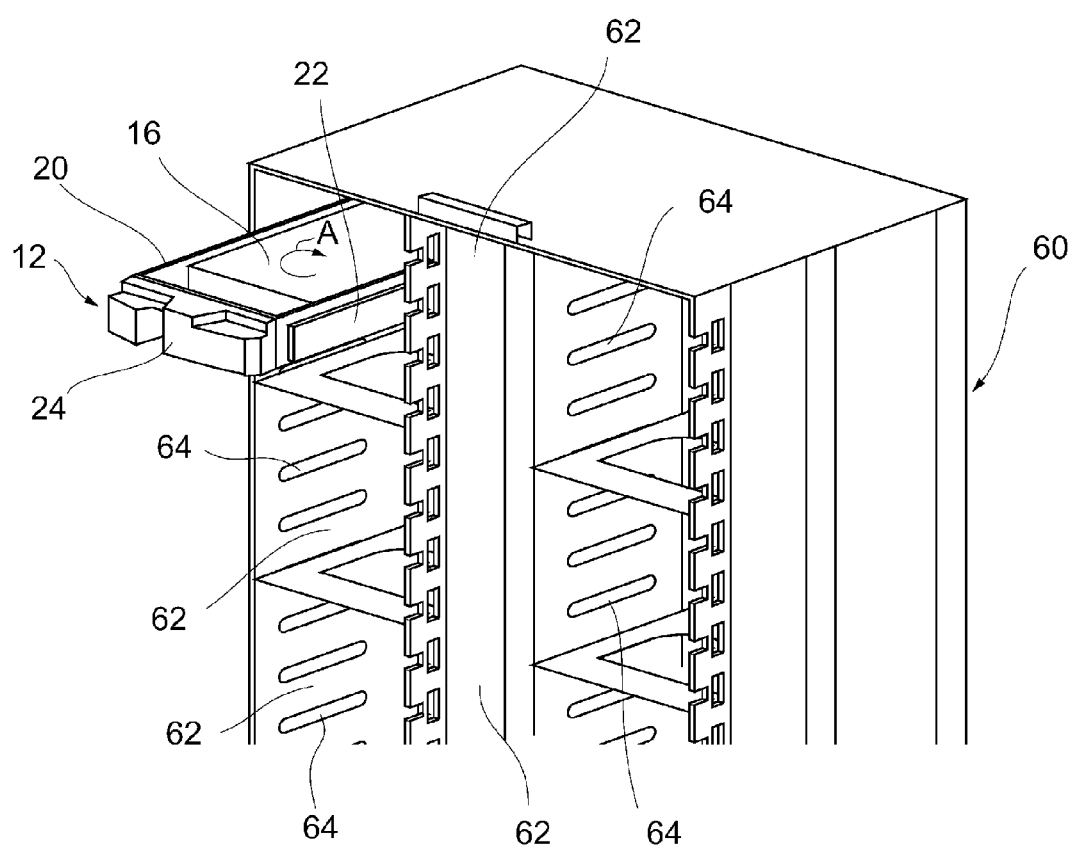
FIG. 7 is a perspective diagram of an HDD housing device in which the HDD unit is horizontally installed.

Next, the perspective diagram of the HDD housing device in which the HDD unit is horizontally installed is shown in FIG. 7.

In FIG. 7, a plurality of housing units 62 are formed in the HDD housing device 60, and a plurality of guides 64 for horizontally installing the HDD unit 12 are formed on the left and right internal surfaces of each of the housing units 62.

Specifically, on the left and right internal surfaces of each of the housing units 62, a pair of guides 64 facing each other for shifting the HDD 16 of the HDD unit 12 in the horizontal direction is placed in the horizontal direction from the open side toward the backboard side while pairs of guides 64 are placed at equal intervals in the vertical direction over a plurality of steps. Consequently, the HDD unit 12 is horizontally installed in the housing unit 62 as the rails 20 and 22 shift in the horizontal direction from the open side toward the backboard side along the pair of guides 64 after the HDD connector side is inserted in the housing unit 62.

Figure 8:
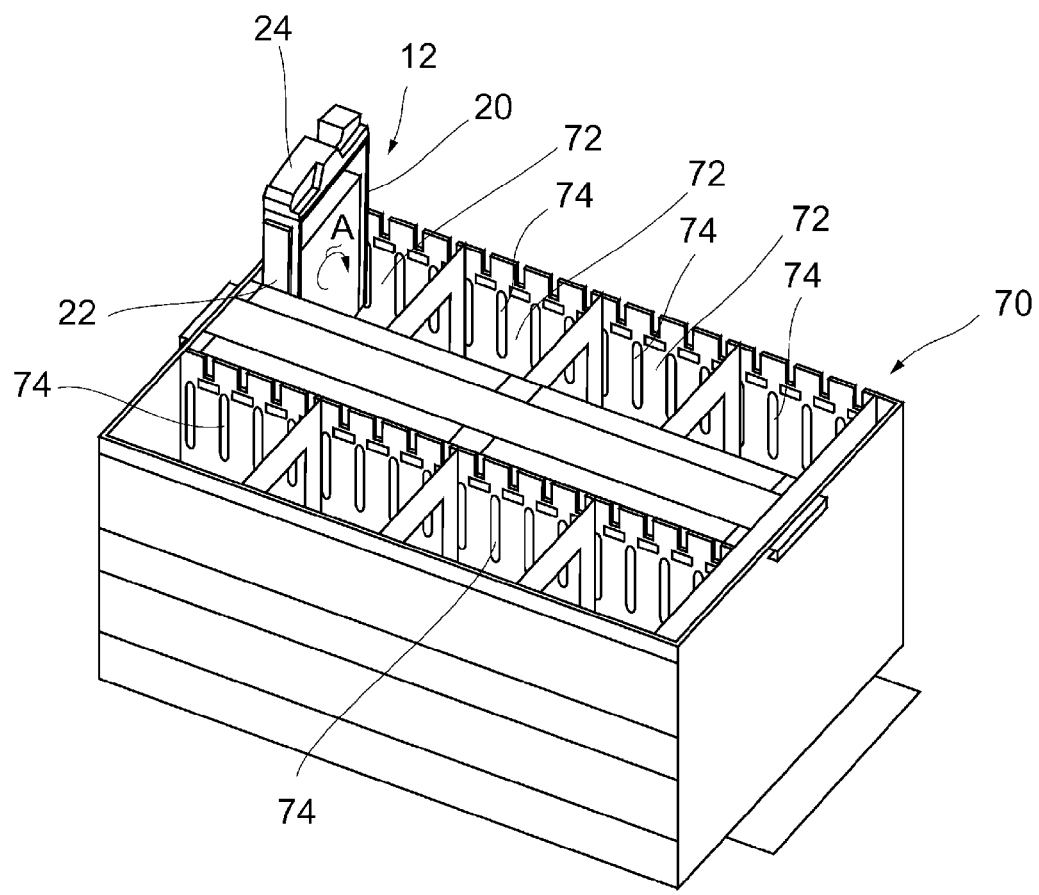
FIG. 8 is a perspective diagram of an HDD housing device in which the HDD unit is installed downward.

Next, the perspective diagram of the HDD housing device in which the HDD unit is installed downward is shown in FIG. 8.

In FIG. 8, a plurality of housing units 72 whose upper sides are opened are formed in the HDD housing device 70, and a plurality of guides 74 for installing the HDD unit 12 downward are formed on the internal surfaces of both of the lateral sides of each of the housing units 72. Specifically, on the internal surfaces of both of the lateral sides of each of the housing units 72, a pair of guides 74 facing each other for shifting the HDD 16 of the HDD unit 12 in the vertical direction is placed in the vertical direction from the open side toward the backboard side while a plurality of pairs of guides 74 are placed at equal intervals in the horizontal direction.

Consequently, the HDD unit 12 is installed in the housing unit 72 downward as the rails 20 and 22 shift in the vertical direction from the open side toward the backboard side along the pair of guides 74 after the HDD connector side is inserted in the housing unit 72.

Figure 9:
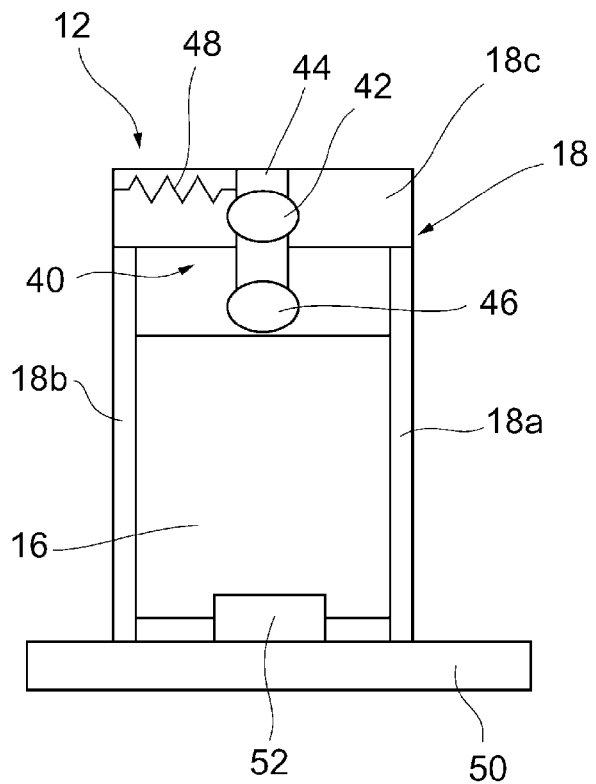
FIG. 9 is a plain view of the HDD unit fixed downward to the backboard.

Furthermore, for installing the HDD unit 12 downward, as shown in FIG. 9, unintended influence of gravity acceleration can be prevented by changing the position of the weight 46.

Specifically, the configuration in which the beam 44 is shortened while, instead of storing the weight 46 in the cavity 24a of the handle 24, the weight 46 is placed between the cylinder 42 and the HDD 16, and the spring 48 is placed on the opposite side of the weight 46 with the cylinder 42 in the middle is adopted.

In this case, even if the handle 24 cannot be installed in the HDD unit 12, the dynamic absorber 40 can be installed in the HDD unit 12 without the weight 46 having to protrude from the HDD unit 12.

Next, the vibration reduction effect in case the dynamic absorber 40 is installed in the HDD unit 12 is explained in accordance with Figures from 10 to 13.

Figure 10:
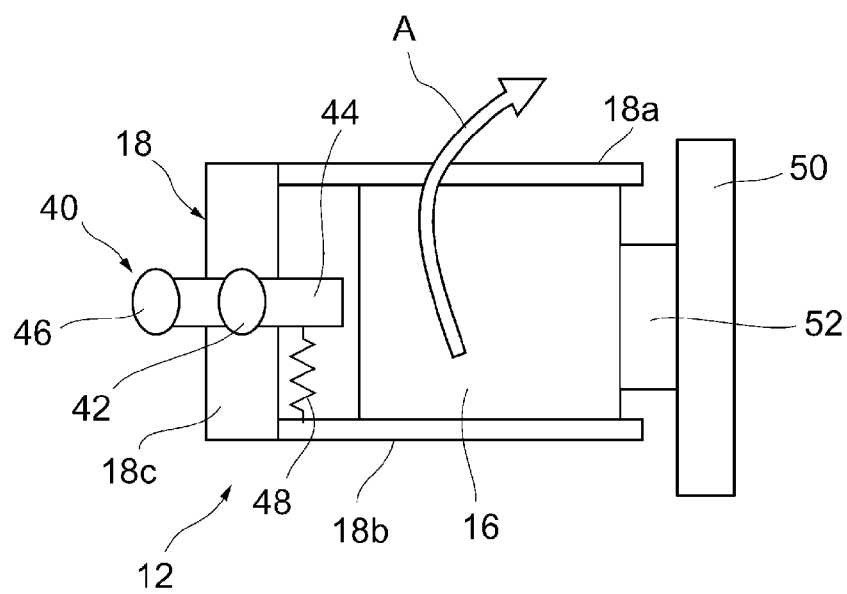
FIG. 10 is an explanatory diagram explaining the power in the rotation direction acting on the HDD unit.

In FIG. 10, in the HDD unit 12, when the magnetic disks 28 rotate, vibration in the rotation direction acting on the HDD unit 12 may occur with a part of the HDD unit 12, that is, a part of the HDD 16, for example, the HDD connector connected to the connector 52, as the virtual central axis. This vibration in the rotation direction, for example, acts on the HDD unit 12 as power A in the rotation direction.

Figure 11:
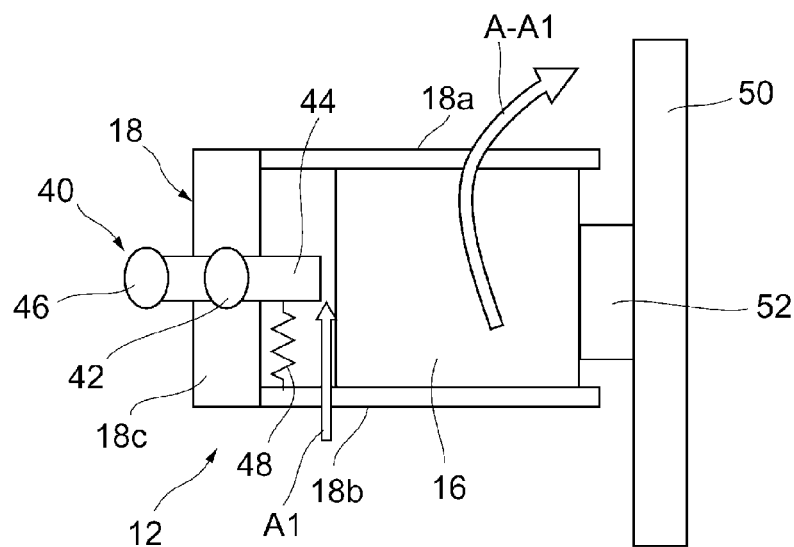
FIG. 11 is an explanatory diagram explaining the power acting on the HDD and the power acting on a spring.

As for this power A in the rotation direction, as shown in FIG. 11, a part thereof acts as power A1 on the dynamic absorber 40 by way of the spring 48. Consequently, the remaining power (A-A1) acts on the HDD unit 12 as the power which rotates the entire HDD unit 12.

Figure 12:
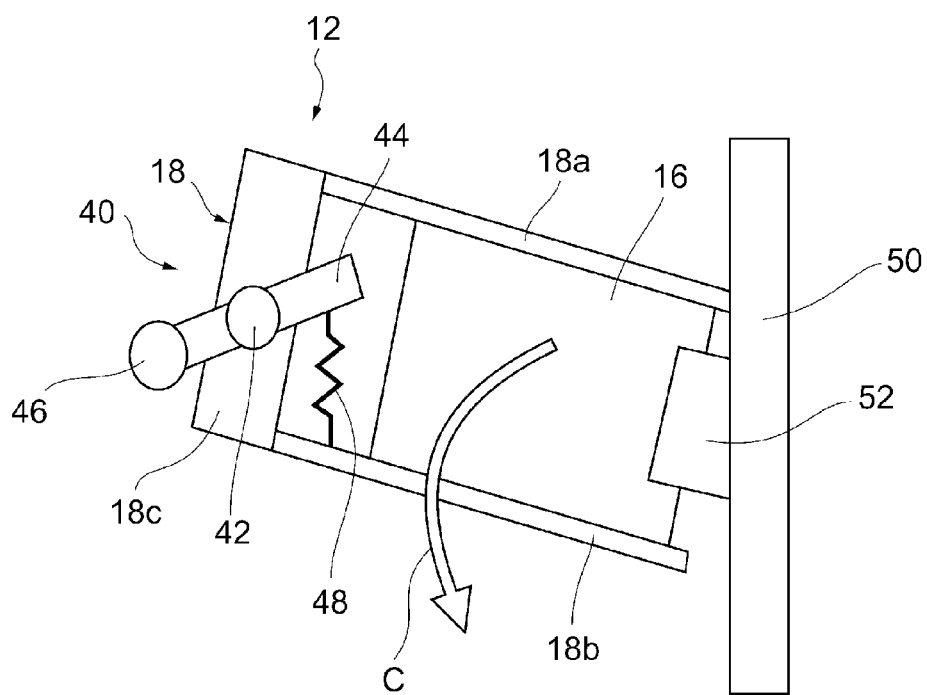
FIG. 12 is an explanatory diagram explaining the status where the power for returning to the original position acts on the HDD.

Consequently, the HDD unit 12 rotates and tilts with a part of the HDD connector or the connector 52 as the virtual rotation axis. Meanwhile, as shown in FIG. 12, power C for returning the HDD unit 12 to the original position occurs from the dynamic absorber 40.

Figure 13:
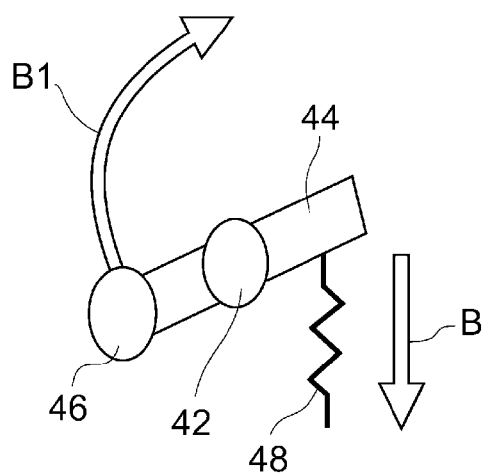
FIG. 13 is an explanatory diagram explaining the relationship of the power acting on the dynamic absorber.

Specifically, as shown in FIG. 13, the weight 46 rotates by the power A1 with the cylinder 42 as the rotation axis, and the spring 48 extends if the weight 46 tilts on the basis of a virtual central line connecting the center of the cylinder 42 and the center of the connector 52. If the spring 48 extends, restoration power B for returning the spring 48 to the original position occurs from the spring 48. Consequently, the weight 46 engages in rotational motion with the cylinder 42 as the rotation center by power B1 which is in the opposite direction from the power C for returning the HDD unit 12 to the original position.

Therefore, by designing the total mass of the dynamic absorber 40 and the spring constant of the spring 48 for the peak frequency of the power A which must be reduced and the natural frequency to be consistent and making the power B1 by the rotational motion of the weight 46 and the power C for returning the HDD unit 12 to the original position consistent, rotation vibration of the HDD unit 12 can be reduced as a result.

In this step, if the total mass of the dynamic absorber 40 is assumed to be m and the spring constant of the spring 48 used for the dynamic absorber 40 is assumed to be k, the natural frequency or the natural angle frequency of the dynamic absorber 40 can be expressed by the Math 1 below.

Figure 14:
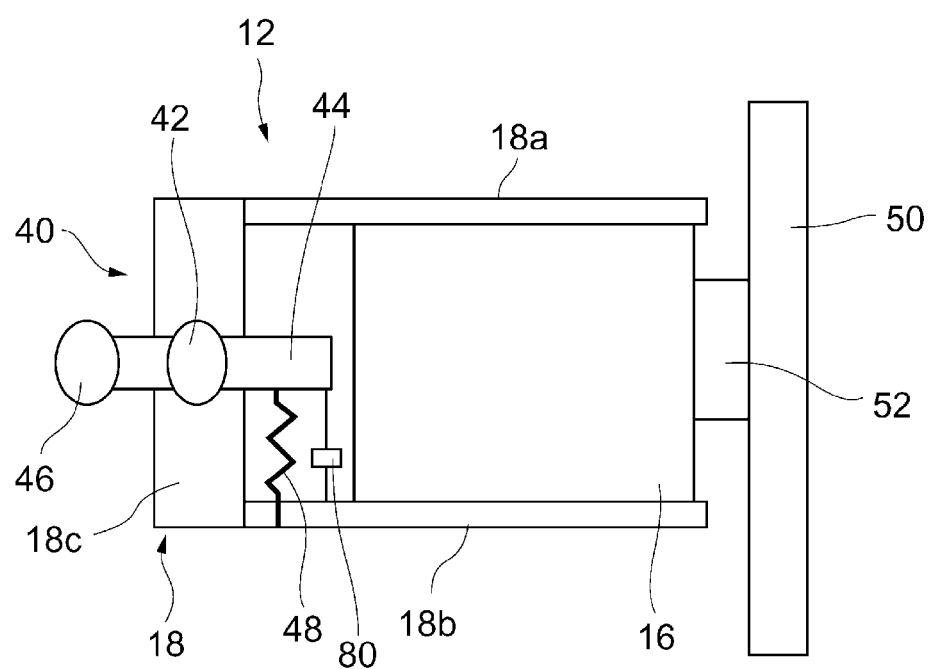
FIG. 14 is a plain view of the HDD unit in which a vibration damping component is added to the dynamic absorber.

Math 1

$$2\pi f = \omega = \sqrt{(k/m)} \quad \text{Math 1}$$

f: the natural frequency of the dynamic absorber
ω: the natural angle frequency of the dynamic absorber
m: the total mass of the dynamic absorber
k: the spring constant of the spring Next, the plain view of the HDD unit in which a vibration damping component is added to the dynamic absorber is shown in FIG. 14.

In FIG. 14, a vibration damping component 80 is added to the HDD unit 12 as well as the dynamic absorber 40. As the vibration damping component 80, for example, rubber material can be used. For adding this vibration damping component 80 to the HDD unit 12, for example, one end of the vibration damping component 80 is fixed to the beam 44 while the other end of the vibration damping component 80 is fixed to the side 18b of the canister 18, and the vibration damping component 80 is placed in parallel with the spring 48.

Since the vibration damping component 80 is installed in the HDD unit 12 for adding the elastic force in the direction which inhibits the rotational motion of the weight 46 to the beam 44, the rotation vibration of the HDD unit 12 can be reduced even further.

Figure 15:
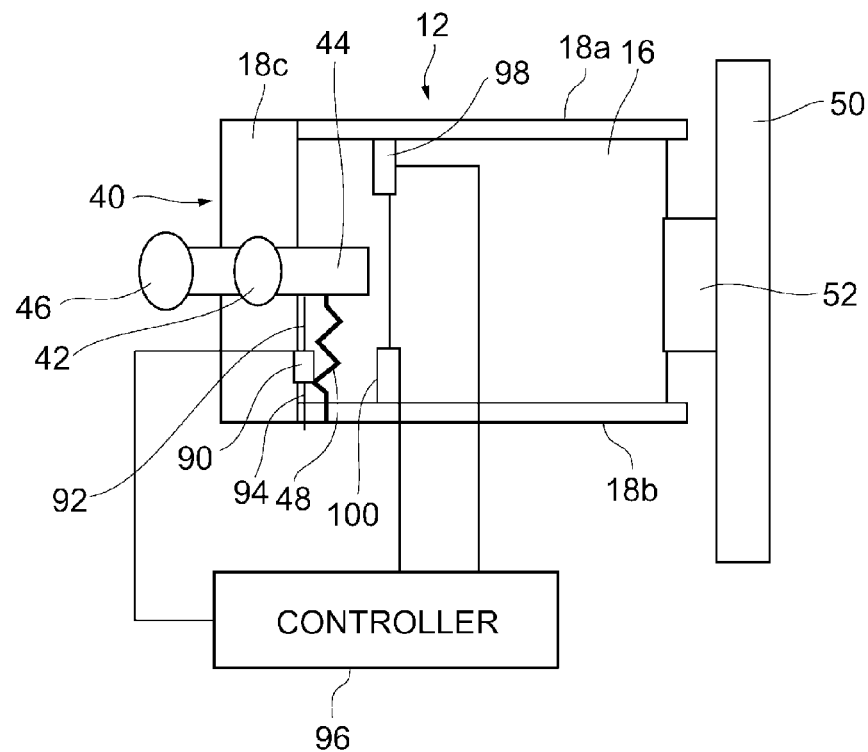
FIG. 15 is a conceptual diagram explaining the configuration of the HDD unit in which a piezoactuator is added to the dynamic absorber.

Next, the plain view of the HDD unit in which the dynamic absorber and the piezoactuator are used in combination is shown in FIG. 15.

In FIG. 15, the dynamic absorber 40 and the piezoactuator 90 are used in combination in the HDD unit 12.

The piezoactuator 90 comprises rods 92 and 94 and is placed in parallel with the spring 48 of the dynamic absorber 40. The piezoactuator 90 is connected to the controller 96, and the rod 92 is coupled to the beam 44 while the rod 94 is coupled to the side 18b of the canister 18.

The controller 96 is configured as a computer apparatus comprising, for example, a CPU (Central Processing Unit), a memory, an input/output interface (none shown in the figure) and others, and the input/output interface is connected to acceleration sensors 98 and 100. The acceleration sensors 98 and 100 are respectively close to the sides 18a and 18b of the canister 18 and fixed to the HDD 16. The respective acceleration sensors 98 and 100 respectively detect acceleration acting on the HDD 16, and output the respectively detected acceleration to the controller 96.

The controller 96 ascertains the rotation acceleration based on the acceleration detected by the respective acceleration sensors 98 and 100, and drives the piezoactuator 90 in accordance with the ascertained value.

Here, the controller 96 drives the piezoactuator 90 for forcibly inhibiting vibration in the rotation direction acting on the HDD unit 12.

For example, if the HDD unit 12 vibrates, for example, by the power A in the rotation direction shown in FIG. 10, the controller 96 ascertains the rotation acceleration based on the acceleration detected by the respective acceleration sensors 98 and 100, and drives the piezoactuator 90 in the direction where the spring 48 extends in accordance with the ascertained value. If the piezoactuator 90 is driven in the direction where the spring 48 extends, the weight 46 rotates in the opposite direction from the power A in the rotation direction with the cylinder 42 as the rotation center. Consequently, the weight 46 vibrates so as to minimize the vibration of the entire HDD unit 12.

In this step, even if the vibration in the rotation direction occurs in the HDD unit 12, the vibration of the HDD unit 12 in the rotation direction can be reduced by forcibly driving the piezoactuator 90 even if the natural frequency of the dynamic absorber 40 and the peak frequency of the power A which must be reduced are different.

According to the present embodiment, by designing the dynamic absorber 40 for making the peak frequency of the power A which must be reduced and the natural frequency of the dynamic absorber 40 consistent, even if vibration in the rotation direction occurs in the HDD unit 12, the vibration of the HDD unit 12 in the rotation direction can be reduced regardless of the installation direction of the HDD unit 12 (vertical, horizontal, or downward).

Furthermore, according to the present embodiment, if the dynamic absorber 40 and the piezoactuator 90 are used in combination, even if vibration in the rotation direction occurs in the HDD unit 12, the vibration of the HDD unit 12 in the rotation direction can be reduced by forcibly driving the piezoactuator 90 even if the natural frequency of the dynamic absorber 40 and the peak frequency of the power A which must be reduced are different.

(Embodiment 2)

The present embodiment is an application example of the case where no space for installing the handle exists in the HDD unit.

Figure 16:
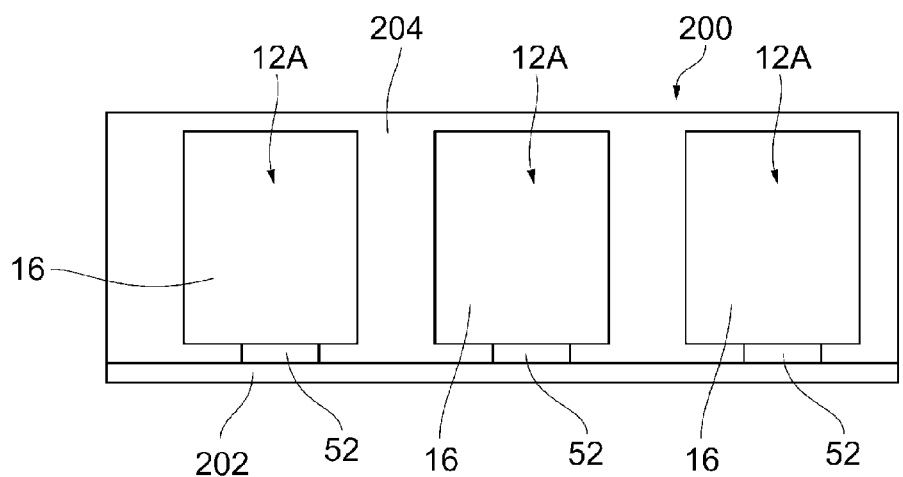
FIG. 16 is a plain view of an HDD unit in Embodiment 2.

FIG. 16 is a plain view of the HDD housing unit in which the HDD unit in which no space for installing the handle exists is installed.

In FIG. 16, the HDD housing unit 200 comprises a flat backboard 202 and a rectangular chassis 204, and three HDD units 12A are mounted on the backboard 202 by way of the connector 52.

Figure 17:
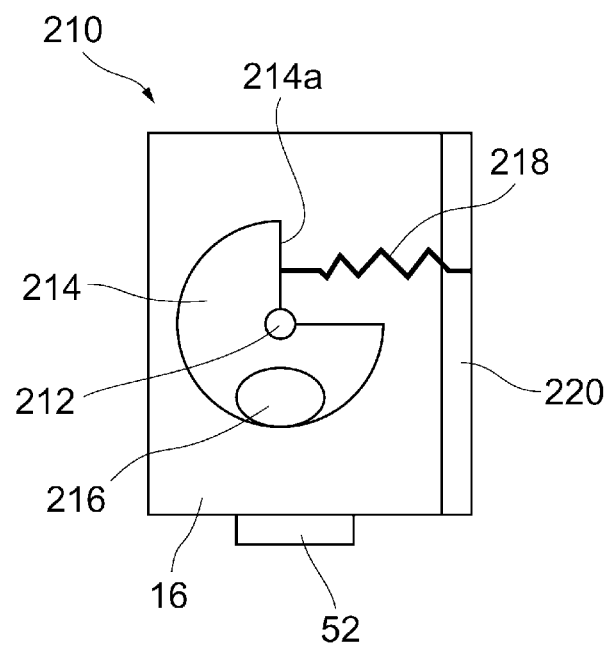
FIG. 17 is a plain view of a dynamic absorber in Embodiment 2.
Figure 18:
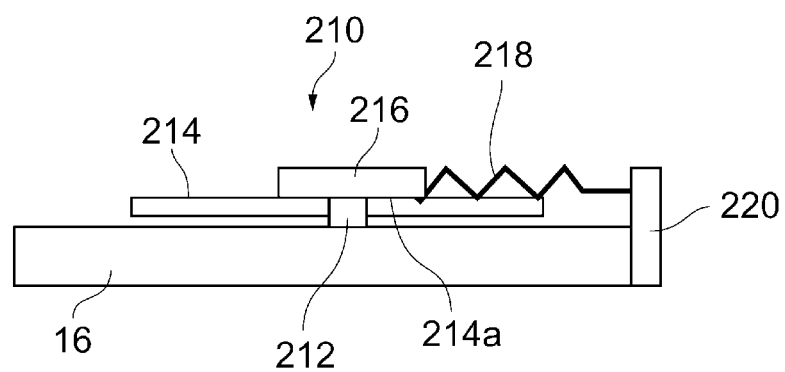
FIG. 18 is a front view of the dynamic absorber in Embodiment 2.

The HDD unit 12A is in the configuration that the handle 24 is removed from the HDD unit 12 in Embodiment 1, and a dynamic absorber 210 is installed in this HDD unit 12A as shown in FIG. 17 and FIG. 18.

The dynamic absorber 210 is configured of a rotation axis 212 fixed to the HDD 16, a sheet disk 214 formed in a fan-like shape and rotatably mounted on the rotation axis 212, a weight 216 formed in a disk-like shape and fixed to the end of the sheet disk 214, and a spring 218 formed in the form of a coil.

The spring 218 is placed between a concave part 214a of the sheet disk 214 and a supporting board 220 fixed to the HDD 16, and one end of the axial direction of the spring 218 is coupled to the concave part 214a while the other end of axial direction of the spring 218 is coupled to the supporting board 220. The sheet disk 214 comprises the same function as the beam 44 in the dynamic absorber 40 and is rotatably placed with the rotation axis 212 as the rotation center, wherein the load by the weight 216 is added to one end of the radial direction, and the elastic force by the spring 218 is added to the other end of the radial direction.

In the present embodiment, if vibration in the rotation direction occurs in the HDD unit 12A and it is considered that the power A in the rotation direction acts on the HDD unit 12A, by designing the dynamic absorber 210 for making the peak frequency of the power A acting on the HDD unit 12A and the natural frequency of the dynamic absorber 210 consistent, the dynamic absorber 210 engages in rotational motion by the timing which negates rotational motion of the HDD unit 12A even if vibration in the rotation direction occurs in the HDD unit 12A. Consequently, vibration of the HDD unit 12A in the rotation direction can be reduced as a result.

According to the present embodiment, by designing the dynamic absorber 210 for making the peak frequency of the power A which must be reduced and the natural frequency of the dynamic absorber 210 consistent, even if vibration in the rotation direction occurs in the HDD unit 12A, the vibration of the HDD unit 12A in the rotation direction can be reduced regardless of the installation direction of the HDD unit 12A (vertical, horizontal, or downward).

Furthermore, according to the present embodiment, since the dynamic absorber 210 is placed in the HDD 16, the dynamic absorber 210 and the HDD unit 12A can be downsized compared with the equivalents of Embodiment 1. Furthermore, the dynamic absorber 210, which is installed outside the HDD 16, may easily be applied to any types of HDDs.

(Embodiment 3)

The present embodiment is an application example for reducing vibration in the rotation direction acting on the HDD unit and vibration in the direction normal to the disk surface of the HDD.

Figure 19:
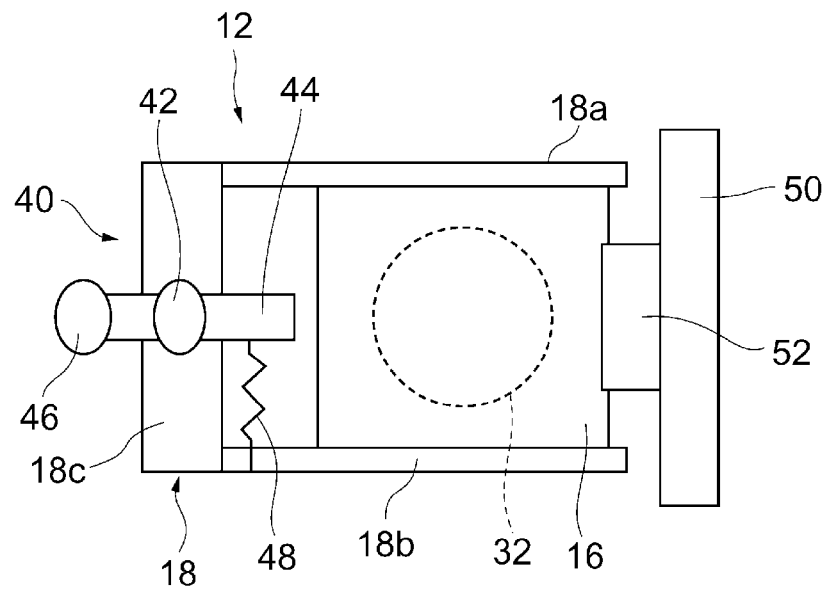
FIG. 19 is a plain view of a dynamic absorber in Embodiment 3.
Figure 20:
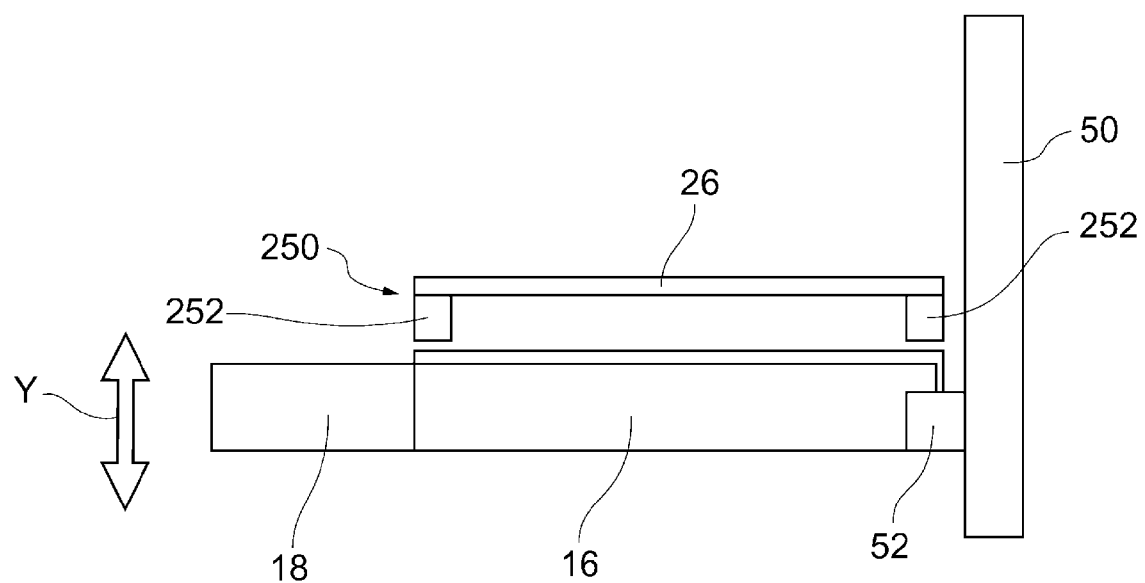
FIG. 20 is a front view of the main part of the dynamic absorber in Embodiment 3.

The plain view of the HDD unit in Embodiment 3 is shown in FIG. 19 and the front view of the main part of the HDD unit in Embodiment 3 is shown in FIG. 20.

In FIG. 19 and FIG. 20, in the HDD unit 12, the dynamic absorber 40 which absorbs vibration of the HDD unit 12 in the rotation direction is placed, and a dynamic absorber 250 which absorbs vibration in the direction normal to the disk surface of the magnetic disk 28, that is, vibration in the translational direction Y is also placed.

The dynamic absorber 250 is configured as an auxiliary dynamic absorber comprising an HDD cover 26 and a plurality of vibration damping component combinations 252 in which springs and vibration damping components are combined. The respective vibration damping component combinations 252 are placed on the four corners of the HDD cover 26. The four vibration damping component combinations 252 are mounted in a gap between the HDD cover 26 and the canister 18 when the HDD cover 26 is mounted on the HDD unit 12.

Consequently, if vibration in the translational direction Y is transmitted to the HDD unit 12, this vibration in the translational direction Y is reduced by the dynamic absorber 250.

Furthermore, similarly in the present embodiment, vibration in the rotation direction acting on the HDD unit 12 is absorbed by the dynamic absorber 40.

According to the present embodiment, by designing the dynamic absorber 40 for making the peak frequency of the power A which must be reduced and the natural frequency of the dynamic absorber 40 consistent, even if vibration in the rotation direction occurs in the HDD unit 12, the vibration of the HDD unit 12 in the rotation direction can be reduced regardless of the installation direction of the HDD unit 12 (vertical, horizontal, or downward).

Furthermore, according to the present embodiment, even if vibration in the translational direction Y is transmitted to the HDD unit 12, the vibration in the translational direction Y can be reduced.

(Embodiment 4)

The present embodiment is an application example of inhibiting vibration of an HDD unit among a plurality of HDD units from being transmitted to the other HDD units.

Figure 21:
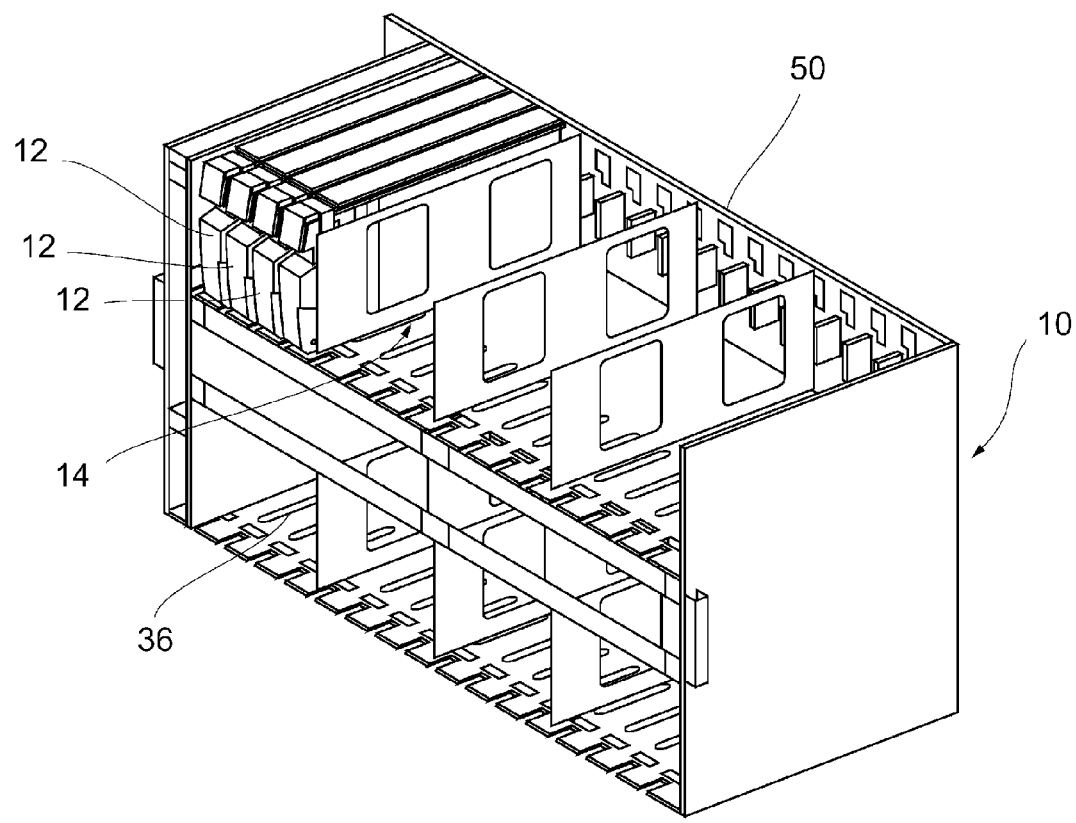
FIG. 21 is a perspective diagram of an HDD housing device in Embodiment 3.

The perspective diagram of the HDD housing device in which a plurality of HDD units are installed is shown in FIG. 21.

Figure 22:
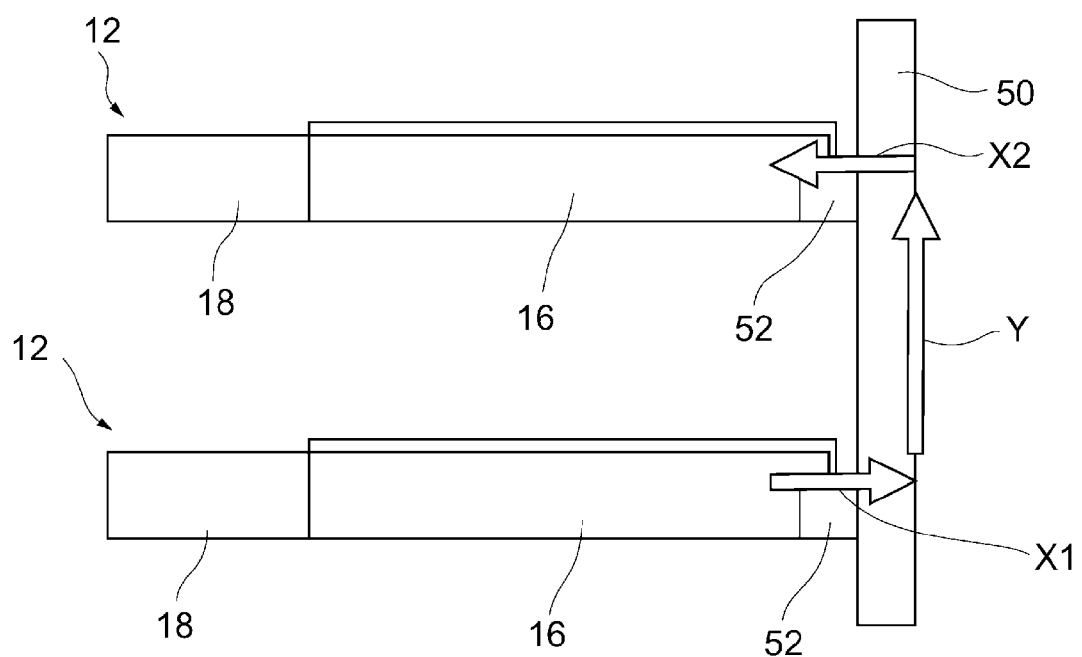
FIG. 22 is a plain view explaining the status where vibration of an HDD is transmitted to another HDD by way of the backboard.

In FIG. 21, if a plurality of HDD units 12 are installed in the housing unit 14 of the HDD housing device 10, for example, as shown in FIG. 22, vibration of the HDD 16 of an HDD unit 12 is transmitted to the backboard 50 by way of the connector 52 as vibration in the translational direction X1. This vibration is transmitted by way of the backboard 50 as vibration in the translational direction Y and may also be transmitted to the HDD 16 of the other HDD unit 12 as vibration in the translational direction X2 by way of the connector 52.

Figure 23:
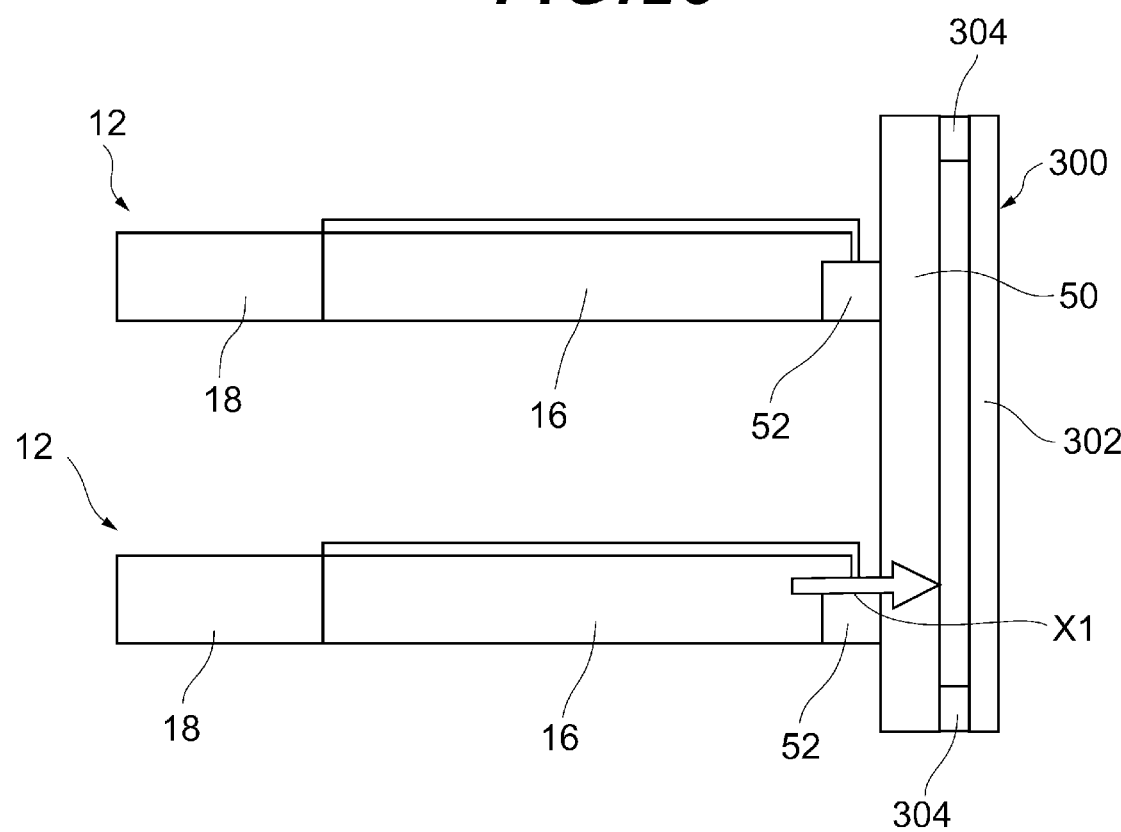
FIG. 23 is a plain view explaining the status where the dynamic absorber absorbing vibration in the translational direction is added to the backboard.

Therefore, for reducing the transmission of this vibration in the translational direction X2 to the other HDDs 16, the present embodiment sees to it as shown in FIG. 23 that the dynamic absorber 300 is fixed to the backboard 50 to absorb vibration in the translational direction X1 by the dynamic absorber 300.

The dynamic absorber 300 is configured of a weight 302 formed in the form of a flat board and a plurality of vibration damping component combinations 304 in which springs and vibration damping components are combined. The respective vibration damping component combinations 304 are set in between the weight 302 and the backboard 50 and fixed to the backboard 50.

If vibration in the translational direction X1 occurring from an HDD 16 is transmitted to the backboard 50 by way of the connector 52, the dynamic absorber 300 can absorb this vibration in the translational direction X1 and inhibit the transmission of vibration in the translational direction X1 to the other HDDs 16 as vibration in the translational direction Y and vibration in the translational direction X2.

By the present embodiment, similarly, by placing the dynamic absorber 40 or the dynamic absorber 210 in each of the HDD units 12 and designing the dynamic absorber 40 or the dynamic absorber 210 for making the peak frequency of the power A which must be reduced and the natural frequency of the dynamic absorber 40 or the dynamic absorber 210 consistent, even if vibration in the rotation direction occurs in the HDD unit 12, vibration of the HDD unit 12 in the rotation direction can be reduced regardless of the installation direction of the HDD unit 12 (vertical, horizontal, or downward).

Furthermore, according to the present embodiment, even if vibration in the translational direction X1 occurs from an HDD 16 among a plurality of HDD units 12, the transmission of this vibration to the other HDDs 16 by way of the backboard 50 can be inhibited.

(Combination of Dynamic Absorbers)

Figure 24:
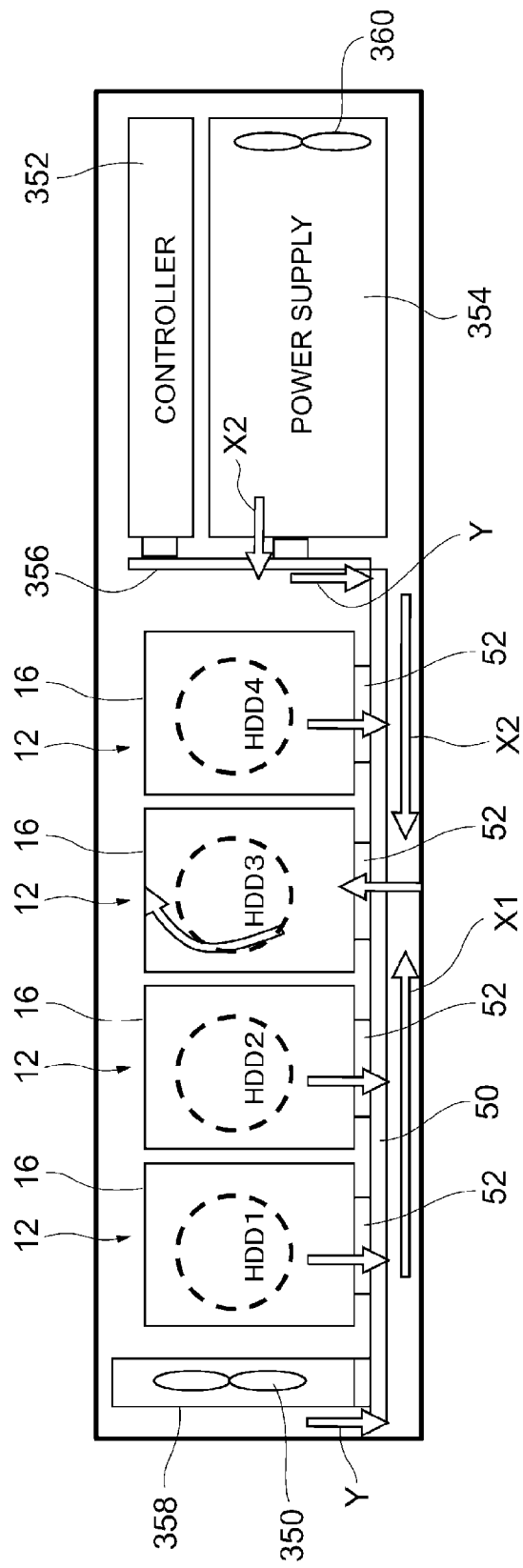
FIG. 24 is a plain view of a disk array apparatus in which a plurality of HDD units are installed along with a controller, a power supply, and others.

The plain view of the disk array apparatus in which a plurality of HDD units are installed along with a controller and a power supply is shown in FIG. 24.

In FIG. 24, a plurality of HDD units 12 are installed on the backboard 50 along with a cooling fan 350, and a controller 352 and a power supply 354 are installed on the substrate 356 coupled to the backboard 50.

Here, for example, if an HDD unit 12 #3 among HDD units 12 from #1 to #4 is focused on, three types of vibration described below can be named as vibration affecting the HDD unit 12 #3.

(1) Vibration by the HDD unit 12 #3.

(2) Vibration in the translational direction Y which occurs from another HDD unit 12 and is transmitted by way of the backboard 50.

(3) Vibration in the translational direction X1 by the HDD cooling fan 350 stored in the chassis 358 which is transmitted by way of the chassis 358 and the backboard 50, or vibration in the translational direction X2 by the power supply cooling fan 360 placed in the power supply 354 which is transmitted by way of the substrate 356 and the backboard 50.

In case of vibration due to (1), vibration in the rotation direction acting on the HDD unit 12 can be reduced by installing the dynamic absorber 40 or the dynamic absorber 210 in the HDD unit 12 #3.

In case of vibration due to (2), the transmission of vibration in the translational direction Y to the HDD unit 12 #3 can be reduced by installing the dynamic absorber 250 in the HDD unit 12 #3.

In case of vibration due to (3), vibration in the translational directions X1 and X2 can be reduced by adopting the configuration in which the dynamic absorbers 300 are installed on the backboard 50 and the substrate 356.

Figure 25:
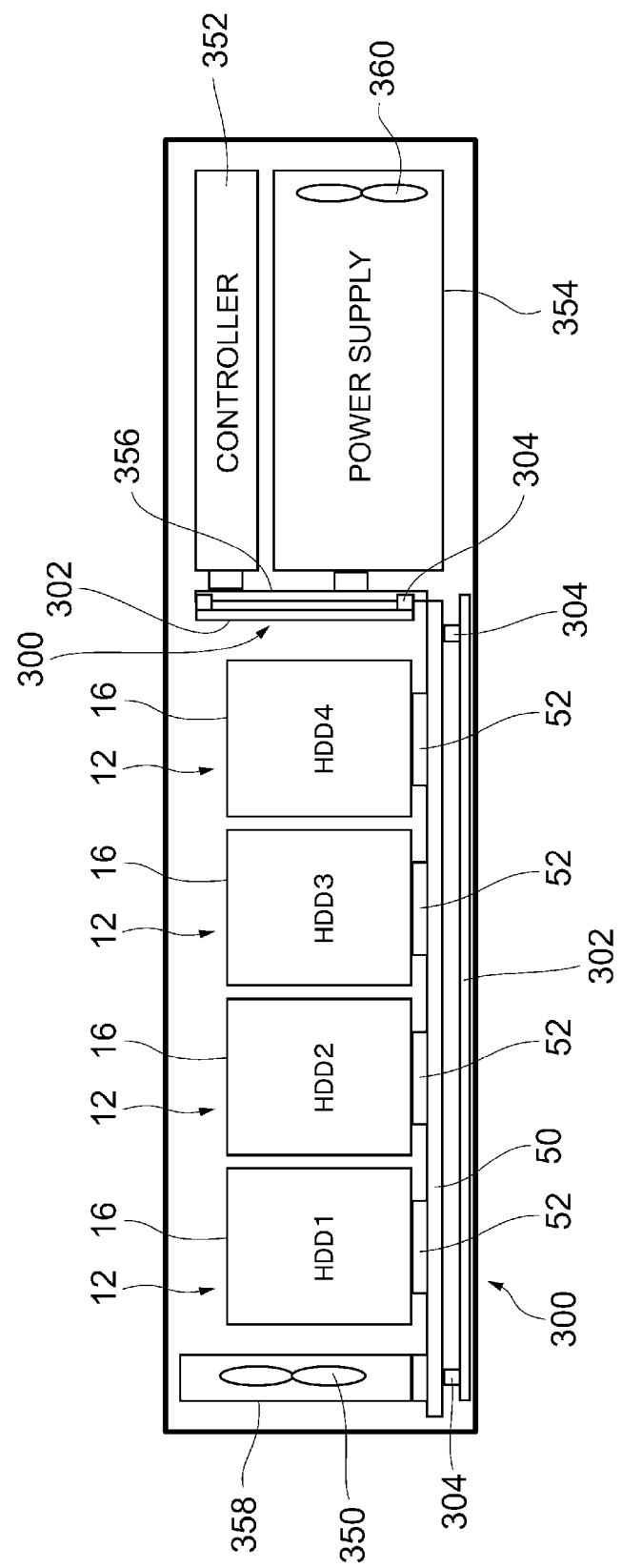
FIG. 25 is a plain view of a disk array apparatus in which a dynamic absorber is installed in the substrate.

For example, as shown in FIG. 25, the dynamic absorbers 300 are respectively installed on the backboard 50 and the substrate 356.

In FIG. 25, each of the dynamic absorbers 300 is configured of a weight 302 formed in the form of a flat board and a plurality of vibration damping component combinations 304 and is installed on the backboard 50 or the substrate 356.

(Application)

Figure 26:
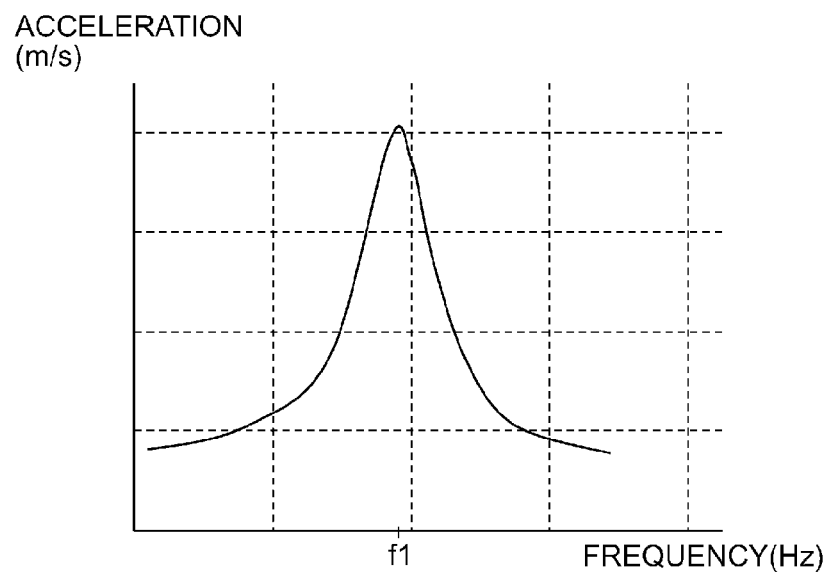
FIG. 26 is a rotation vibration rheogram of the HDD.

If vibration in the rotation direction acts on the HDD unit 12, rotation vibration of the HDD 16 configuring the HDD unit 12 assumes the characteristics shown in FIG. 26, for example. In this case, the peak frequency of the rotation vibration of the HDD 16 is f1.

Figure 27:
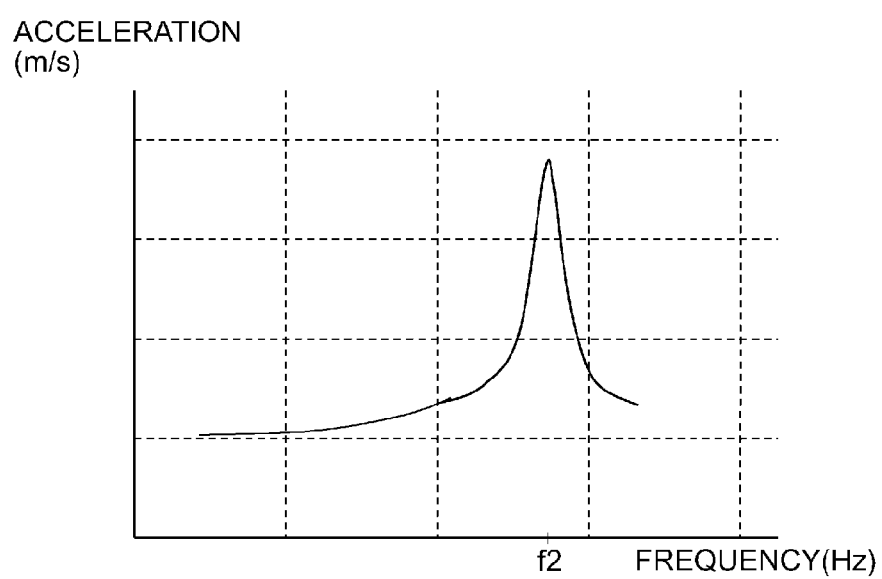
FIG. 27 is a rotation rheogram of a canister.

Meanwhile, if vibration in the rotation direction acts on the HDD unit 12, rotation vibration of the canister 18 configuring the HDD unit 12 assumes the characteristics shown in FIG. 27, for example. In this case, the natural frequency of the canister 18 is f2.

Figure 28:
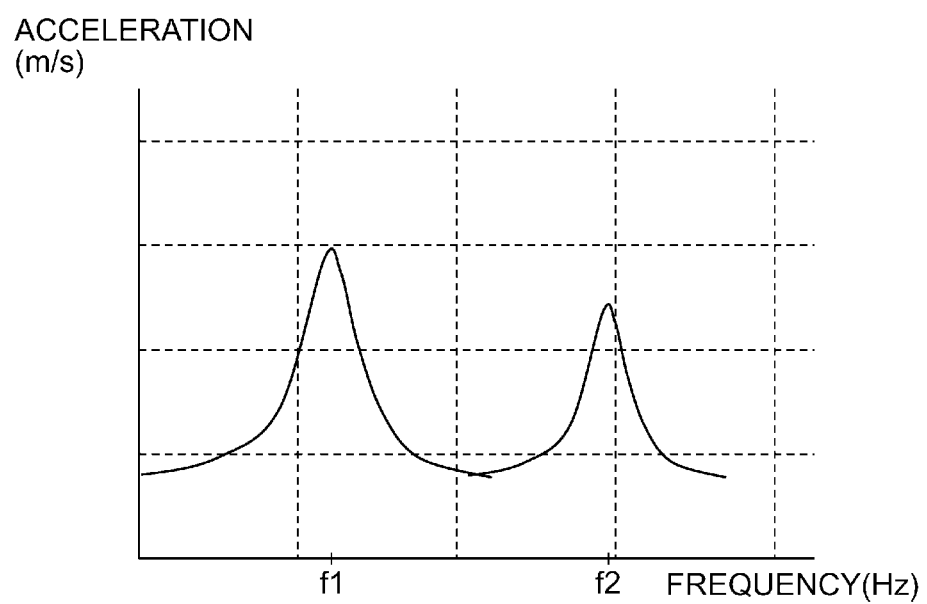
FIG. 28 is a vibration rheogram of the HDD unit in case the natural frequency of the HDD and the natural frequency of the canister are different.

Normally, for preventing the peak frequency of the HDD unit 12 from being high, the peak frequency f1 of the HDD 16 and the natural frequency f2 of the canister 18 are designed to be different. Consequently, if the HDD 16 and the HDD unit 12 comprising the canister 18 are configured and if vibration in the rotation direction acts on the HDD unit 12, rotation vibration of the HDD unit 12 assumes the characteristics including the frequency f1 and the frequency f2 as frequency contents as shown in FIG. 28, for example.

In this step, if one dynamic absorber 40 or dynamic absorber 210 is installed in the HDD unit 12 and vibration of the HDD unit 12 in the rotation direction is reduced, vibration comprising the frequency contents of the frequency f1 or the frequency f2 can be reduced by making the natural frequency of the dynamic absorber 40 or the dynamic absorber 210 consistent with the frequency f1 or the frequency f2.

Figure 29:
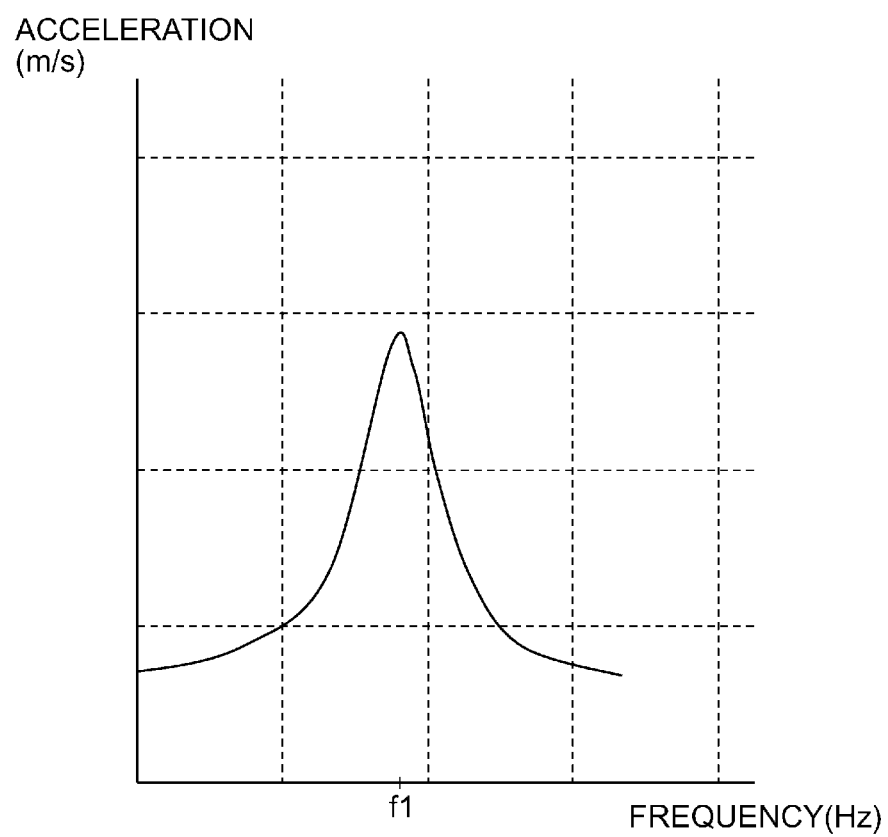
FIG. 29 is a rotation vibration rheogram of the HDD.
Figure 30:
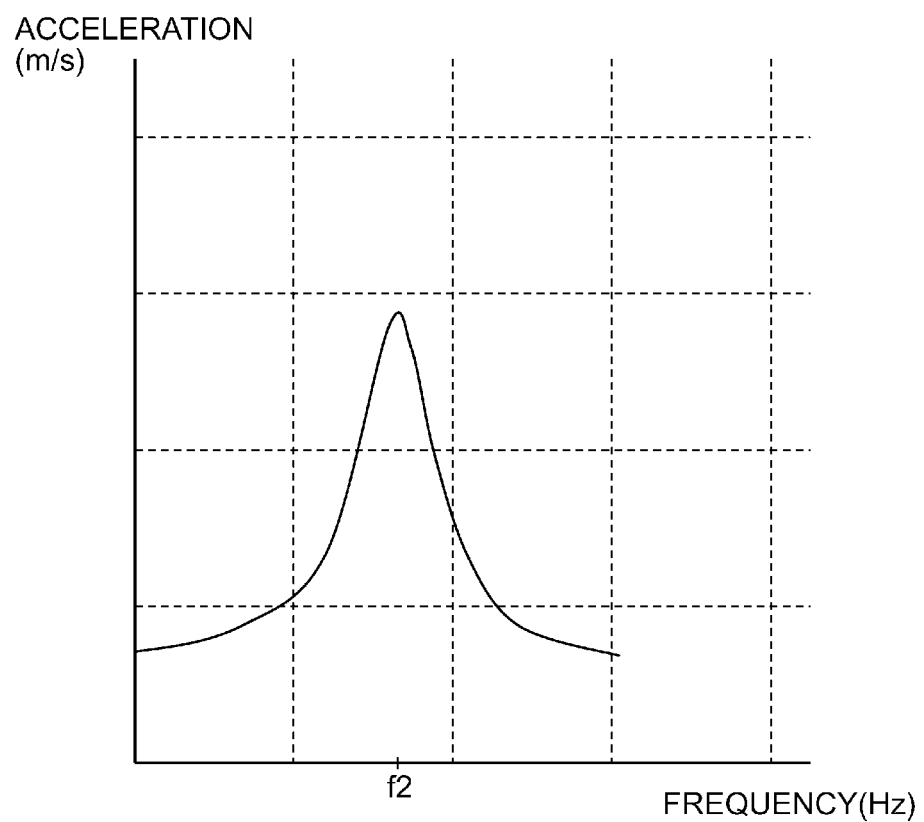
FIG. 30 is a rotation rheogram of the canister.

Meanwhile, as shown in FIG. 29 and FIG. 30, the peak frequency f1 of the HDD 16 and the natural frequency f2 of the canister 18 can also be designed to be the same frequency. Here, for making the natural frequency f2 of the canister 18 consistent with the peak frequency f1 of the HDD 16, the structural design for the canister 18 is performed (f1=f2).

Figure 31:
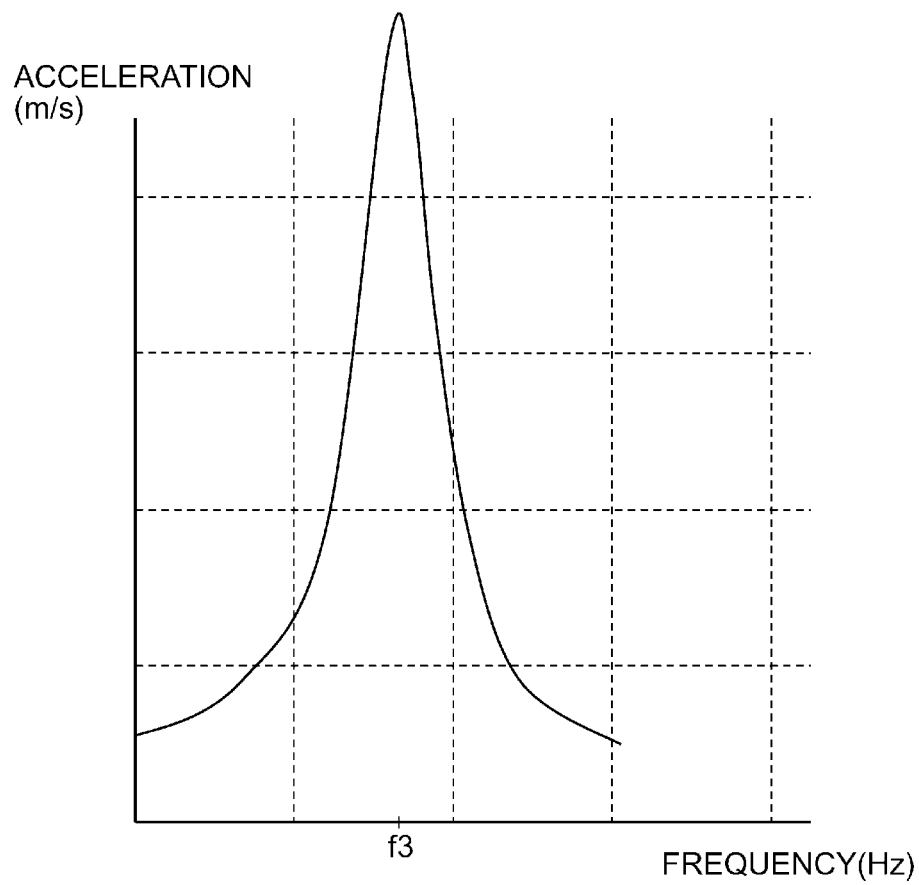
FIG. 31 is a vibration rheogram of the HDD unit in case the natural frequency of the HDD and the natural frequency of the canister are set the same.

In this case, as shown in FIG. 31, if vibration in the rotation direction occurs in the HDD unit 12, the frequency f3 of the HDD unit 12 becomes equal to the peak frequency f1 of the HDD 16 and the natural frequency f2 of the canister 18 (f1=f2=f3) and, at the same time, the peak value becomes higher than the peak values of the peak frequency f1 of the HDD 16 and the natural frequency f2 of the canister 18.

In this step, vibration acting on the HDD unit 12 in the rotation direction can be reduced by installing the dynamic absorber 40 or the dynamic absorber 210 in the HDD unit 12 and adjusting the natural frequency of the dynamic absorber 40 or the dynamic absorber 210 to the frequency f3.

Specifically, vibration acting on the HDD unit 12 in the rotation direction can also be reduced by installing one dynamic absorber 40 or one dynamic absorber 210 in the HDD unit 12.

It should be noted that, if the peak frequency f1 of the HDD 16 and the natural frequency f2 of the canister 18 are designed to be different from each other, vibration comprising the frequency contents of the frequencies f1 and f2 can be respectively reduced by installing two dynamic absorbers 40 or two dynamic absorbers 210 in the HDD unit 12 and adjusting the natural frequency of one of the dynamic absorbers to the frequency f1 and the natural frequency of the other dynamic absorber to the frequency f2.

Next, the block configuration diagram of the computer system is shown in FIG. 32.

In FIG. 32, the computer system comprises a plurality of host computers 400 and a disk array apparatus 402, and the respective host computers 400 and the disk array apparatus 402 are connected by way of a network 404.

It should be noted that, as the network 404, for example, FC SAN (Fibre Channel Storage Area Network), IP SAN (Internet Protocol Storage Area Network), LAN (Local Area Network), WAN (Wide Area Network), and others can be used.

Each of the host computers 400 is, for example, a computer apparatus comprising information processing resources such as a CPU and a memory and is configured as a personal computer, a workstation, or a mainframe. A communication port (not shown in the figure) for each of the host computers 400 to access the disk array apparatus 402 is installed in each of the host computers 400. The CPU of each of the host computers 400 can transmit write commands, read commands, and others to the disk array apparatus 402 by way of the communication port in accordance with the programs stored in the memory.

The disk array apparatus 402 is configured of a plurality of controllers 406 and 408 and an HDD housing device 410. It should be noted that what comprises the same configuration as any HDD housing device among the HDD housing devices 10, 60, and 70 can be used as the HDD housing device 410.

Each of the controllers 406 and 408 is configured of a CPU 412, a plurality of channel control units 414, a data controller 416, a cache memory 418, a memory 420, a PCI (Peripheral Component Interconnect) express control unit 422, a disk control unit 424, a shared memory 426, and an SAS (Serial Attached SCSI) expander 428.

The CPU 412 functions as a processor which performs integrated control of the controller 406 or the entire controller 408.

Each of the channel control units 414 comprises a communication interface for performing the communication with each of the host computers 400, communicates information with each of the host computers 400 by way of the communication interface and, if receiving a data input/output command such as read access and write access from each of the host computers 400, transfers the received data input/output command to the CPU 412 by way of the data controller 416.

The data controller 416 is connected to the CPU 412, each of the channel control units 414, the cache memory 418, the PCI express control unit 422, the disk control unit 424, the shared memory 426, and other series of controllers and, with these connected parts as the transfer target, controls data transfer to the relevant transfer target.

The cache memory 418 is configured of a non-volatile memory and is utilized as a storage area for temporarily storing data by data processing of the CPU 412, for example, input/output data (user data).

The memory 420 is configured as a storage area for storing control programs and others to be performed by the CPU 412.

The PCI express control unit 422 controls data transfer in the controller with the data controller 416.

The disk control unit 424 controls data read access or data write access for each of the storage devices 434.

The shared memory 426 is configured as a memory which can be accessed from each of the channel control units 414 or the disk control unit 424, and control information, commands, and others which are common to each of the channel control units 414 or the disk control unit 424 are stored in the shared memory 426.

The SAS expander 428 is configured as an interface which relays data communicated between the disk control unit 424 and an SAS expander unit 432.

The HDD housing device 410 is configured of a plurality of SAS expander units 432 and a plurality of storage devices 434.

Each of the SAS expander units 432 is configured as an interface which relays data communicated between each of the SAS expanders 428 and each of the storage devices 434.

As each of the storage devices 434, for example, an HDD can be used. If an HDD is used as a storage device, for example, an FC (Fibre Channel) disk, an SCSI (Small Computer System Interface) disk, an SATA (Serial ATA) disk, an ATA (AT Attachment) disk, an SAS (Serial Attached SCSI) disk, and others can be used.

Furthermore, it is also possible to configure a RAID (Redundant Array of Inexpensive Disks) group, for example, RAID4, RAID5, RAID6, and others of the respective storage devices 434 or divide the respective storage devices 434 into a plurality of RAID groups. Here, a plurality of logical units (hereinafter also referred to as LUs (Logical Units)) and a plurality of logical volumes can also be formed in the physical storage area of each of the storage devices 434.

In this step, if a data write request is made from any of the host computers 400, for example, the channel control unit 414 of the controller 406 receives the write command and the write data from the host computer 400. The channel control unit 414 receiving the write command stores the write command in the shared memory 426 by way of the data controller 416 for performing the data input/output processing between the host computer 400 and the storage device 434, and temporarily stores the write data in the cache memory 418 by way of the data controller 416.

Meanwhile, the disk control unit 424 monitors the shared memory 426 and, if detecting that the write command is stored in the shared memory 426, reads the write data from the cache memory 418 in accordance with the write command stored in the shared memory 426, and writes the read write data in the storage device 434 by way of the SAS expander 428 and the SAS expander unit 430.

Furthermore, if a data read request is made from any of the host computers 400, for example, the channel control unit 414 of the controller 406 receives the read command from the host computer 400. The channel control unit 414 receiving the read command stores the read command in the shared memory 426 by way of the data controller 416 and determines whether the read data exists in the cache memory 418 or not.

If the read data exists in the cache memory 418, the channel control unit 414 transmits the read data existing in the cache memory 418 to the host computer 400.

If the read data does not exist in the cache memory 418, the disk control unit 424 which monitored the shared memory 426 and detected the read command performs the read processing.

Specifically, based on the detected read command, the disk control unit 424 which detected the read command accesses the storage device 434 by way of the SAS expander 428 and the SAS expander unit 430, reads the read data from the storage device 434, writes the read read data to the cache memory 418, and also writes to the shared memory 426 that the read data is written to the cache memory 418.

Here, the channel control unit 414 monitors the shared memory 426 and, if detecting the read data is written to the cache memory 418, reads the read data from the cache memory 418 and transmits the read read data to the host computer 400.

Each of the controllers 406 and 408 can perform data input/output processing based on data read requests or the data write requests from each of the host computers 400.

It should be noted that the present invention is not limited to the above-mentioned embodiments and includes various variations. For example, the above-mentioned embodiments are explained in detail for the purpose of explaining the present invention comprehensibly, and the present invention is not necessarily limited to the Embodiments comprising all of the explained components. Furthermore, a part of the configuration of an embodiment may be replaced by the configuration of another embodiment, and the configuration of an embodiment may also be added to the configuration of another embodiment. Furthermore, for a part of the configuration of each of the Embodiments, another configuration may also be added, deleted, or replaced.

Furthermore, the above-mentioned respective configurations, functions, processing units, processing methods and others may also be partially or entirely realized by hardware, for example, through designing by integrated circuits and other methods. Furthermore, the above-mentioned respective configurations, functions, and others may also be realized by software by the processor interpreting and performing the programs which realize the respective functions. The information such as programs, tables and files which realize the respective functions can be recorded in a storage device such as a memory, a hard disk, and an SSD (Solid State Drive), and a storage media such as an IC (Integrated Circuit) card, an SD (Secure Digital) memory card, a DVD (Digital Versatile Disc).

Reference Sign List

10 HDD housing device, 12 HDD unit, 14 housing unit, 16 HDD, 18 canister, 24 handle, 40 dynamic absorber, 42 cylinder, 44 beam, 46 weight, 48 spring, 50 backboard, 52 connector, 60, 70 HDD housing device, 210 dynamic absorber, 212 rotation axis, 214 sheet disk, 216 weight, 218 spring, 400 host computer, 402 disk array apparatus, 406, 408 controller, 410 HDD housing device.

The invention claimed is:

1. The disk unit, comprising:
a hard disk drive including a drive mechanism for rotatably driving one or more disk mediums, an arm disposed movably within a rotation area of the disk medium, and an actuator for performing control of positioning a magnetic head fixed to the arm to a target position of the disk medium;
a chassis for su porting the hard disk drive; and
a dynamic absorber disposed in the hard disk drive or the chassis,
wherein the dynamic absorber absorbs rotation direction vibration acting on the hard disk drive with a part of the hard disk drive as the rotation center,
wherein the dynamic absorber comprises a coupling member for coupling a weight and an elastic member, and a rotation axis which is disposed between the weight and the elastic member and fixed to the chassis, and which rotatably supports the coupling member, wherein the weight is fixed to the coupling member, one end of the axial direction of the elastic member is fixed to the coupling member, the other end of the axial direction is fixed to the chassis, load by the weight is added to one end of the coupling member, and elastic force by the elastic member is applied to the other end of the coupling member, and wherein, when the hard disk drive rotates with a part of the hard disk drive as the rotation center and the weight rotates around the rotation axis pursuant to the rotation direction vibration of the hard disk drive, the elastic member applies elastic force to the coupling member in a direction of inhibiting the rotational motion of the weight.

2. The disk unit according to claim 1, wherein the dynamic absorber comprises a disk for coupling a weight and an elastic member, and a rotation axis which is disposed between the weight and the elastic member and fixed to the hard disk drive, and which rotatably supports the disk, wherein the weight is fixed to the disk, one end of the axial direction of the elastic member is fixed to the disk, the other end of the axial direction is fixed to the hard disk drive via a supporting board, load by the weight is added to one end of the disk, and elastic force by the elastic member is applied to the other end of the disk, wherein, when the hard disk drive rotates with a part of the hard disk drive as the rotation center and the weight rotates around the rotation axis pursuant to the rotation direction vibration of the hard disk drive, the elastic member applies elastic force to the coupling member in a direction of inhibiting the rotational motion of the weight.

3. The disk unit according to claim 1, wherein a vibration damping component for applying, to the coupling member, elastic force of a direction which inhibits the rotational motion of the weight is coupled with the coupling member and the chassis parallel to the elastic member.

4. The disk unit according to claim 1, wherein the natural frequency of the dynamic absorber is set to the same frequency as the peak frequency among the frequencies based on the rotation direction vibration of the hard disk drive.

5. The disk unit according to claim 1, wherein the natural frequency of the dynamic absorber is set to the same frequency as the natural frequency of the hard disk drive or the natural frequency of the chassis among the frequencies based on the rotation direction vibration of the hard disk drive.

6. The disk unit according to claim 1, wherein the chassis is provided with an auxiliary dynamic absorber for absorbing translational direction vibration in which the entire hard disk drive vibrates in a fixed direction.

7. A disk array apparatus, comprising:

a disk housing device including one or more disk units containing a hard disk drive, and a housing unit for removably housing the respective disk units via a connector; and one or more controllers for controlling input and output of data to and from the hard disk drive of the disk unit based on an access request from an access requestor, wherein the disk unit is provided with a first dynamic absorber for absorbing rotation direction vibration acting on the disk unit with a part of the disk unit as the rotation center, wherein the first dynamic absorber comprises a coupling member for coupling a weight and an elastic member, and a rotation axis disposed between the weight and the elastic member and fixed to the chassis, and which rotatably supports the coupling member, and is disposed in a chassis for supporting the hard disk drive, wherein the weight is fixed to the coupling member, one end of the axial direction of the elastic member is fixed to the coupling member, the other end of the axial direction is fixed to the chassis, load by the weight is added to one end of the coupling member, and elastic force by the elastic member is applied to the other end of the coupling member, and wherein, when the hard disk drive rotates with a part of the hard disk drive as the rotation center and the weight rotates around the rotation axis pursuant to the rotation direction vibration of the hard disk drive, the elastic member applies elastic force to the coupling member in a direction of inhibiting the rotational motion of the weight.

8. The disk array apparatus according to claim 7, wherein the disk unit is provided with a second dynamic absorber for absorbing translational direction vibration in which the entire disk unit vibrates in a fixed direction.

9. The disk array apparatus according to claim 7, wherein the housing unit is provided with a board for supporting the connector, and the board is provided with a third dynamic absorber for absorbing translational direction vibration as vibration that is propagated from the disk unit to the board and in which the entire disk unit vibrates in a fixed direction.

10. The disk array apparatus according to claim 7, wherein the first dynamic absorber comprises a disk for coupling a weight and an elastic member, and a rotation axis disposed between the weight and the elastic member and fixed to the hard disk drive, and which rotatably supports the disk, and is disposed in the hard disk drive, wherein the weight is fixed to the disk, one end of the axial direction of the elastic member is fixed to the disk, the other end of the axial direction is fixed to the hard disk drive via a supporting board, load by the weight is added to one end of the disk, and elastic force by the elastic member is applied to the other end of the disk, wherein, when the hard disk drive rotates with a part of the hard disk drive as the rotation center and the weight rotates around the rotation axis pursuant to the rotation direction vibration of the hard disk drive, the elastic member applies elastic force to the coupling member in a direction of inhibiting the rotational motion of the weight.

11. The disk array apparatus according to claim 7, wherein a vibration damping component for applying, to the coupling member, elastic force of a direction which inhibits the rotational motion of the weight is coupled with the coupling member and the chassis parallel to the elastic member.

12. The disk array apparatus according to claim 7, wherein the natural frequency of the first dynamic absorber is set to the same frequency as the peak frequency among the frequencies based on the rotation direction vibration of the hard disk drive.

* * * * *